United States Patent
Ji et al.

(10) Patent No.: US 11,647,404 B2
(45) Date of Patent: May 9, 2023

(54) METHOD AND APPARATUS FOR INDICATING BEAM FAILURE RECOVERY OPERATION OF TERMINAL IN WIRELESS COMMUNICATION SYSTEM

(71) Applicant: Samsung Electronics Co., Ltd., Suwon-si (KR)

(72) Inventors: Hyoungju Ji, Suwon-si (KR); Heecheol Yang, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/998,937

(22) Filed: Aug. 20, 2020

(65) Prior Publication Data

US 2021/0058805 A1 Feb. 25, 2021

(30) Foreign Application Priority Data

Aug. 20, 2019 (KR) .................. 10-2019-0102008

(51) Int. Cl.
*H04W 24/04* (2009.01)
*H04B 17/309* (2015.01)
(Continued)

(52) U.S. Cl.
CPC .......... *H04W 24/04* (2013.01); *H04B 17/309* (2015.01); *H04L 5/0048* (2013.01); *H04W 72/56* (2023.01)

(58) Field of Classification Search
CPC .... H04W 24/04; H04W 72/10; H04B 17/309; H04B 7/0695; H04B 7/0408;
(Continued)

(56) References Cited

U.S. PATENT DOCUMENTS

2017/0303264 A1* 10/2017 Islam ................ H04W 74/0833
2018/0288756 A1   10/2018 Xia et al.
2018/0302889 A1* 10/2018 Guo ...................... H04B 7/088
(Continued)

FOREIGN PATENT DOCUMENTS

KR    10-2019-0029535 A    3/2019

OTHER PUBLICATIONS

Huawei et al., "Beam failure recovery for SCell with new beam information", 3GPP TSG RAN WG1 Meeting #97, May 13-17, 2019, R1-1907533, 7 pages.
(Continued)

*Primary Examiner* — Tejis Daya

(57) ABSTRACT

The disclosure relates to a communication scheme and system of converging an IoT technology and a 5G communication system for supporting a higher data transfer rate beyond a 4G system. The disclosure may be applied to intelligent services (e.g. smart home, smart building, smart city, smart car or connected car, health care, digital education, smart retail, and security and safety services), based on a 5G communication technology and an IoT-related technology. A method of a terminal according to an embodiment includes: receiving information on a reference signal set for beam failure detection from a base station; identifying the reference signal set for beam failure detection based on the information; identifying whether a beam failure is detected based on the reference signal set; and in case that the beam failure is detected for the reference signal set, triggering a beam failure recovery procedure.

16 Claims, 16 Drawing Sheets

(51) Int. Cl.
*H04L 5/00* (2006.01)
*H04W 72/56* (2023.01)

(58) Field of Classification Search
CPC ..... H04B 17/373; H04L 5/0048; H04L 5/001; H04L 5/0096; H04L 5/0094; H04L 5/0053
See application file for complete search history.

(56) References Cited

U.S. PATENT DOCUMENTS

| | | | |
|---|---|---|---|
| 2019/0082335 A1* | 3/2019 | Yu | H04B 7/088 |
| 2019/0173740 A1* | 6/2019 | Zhang | H04W 72/042 |
| 2019/0253127 A1 | 8/2019 | Kang et al. | |
| 2019/0253308 A1* | 8/2019 | Huang | H04B 7/0695 |
| 2019/0349061 A1* | 11/2019 | Cirik | H04L 1/1858 |
| 2020/0045709 A1* | 2/2020 | Seo | H04W 72/0493 |
| 2020/0383096 A1* | 12/2020 | Yang | H04W 72/0406 |
| 2022/0022065 A1* | 1/2022 | Wang | H04W 24/08 |
| 2022/0046438 A1* | 2/2022 | Lo | H04W 24/04 |

OTHER PUBLICATIONS

Asia Pacific Telecom, "Maintenace for Beam Failure Recovery 1", 3GPP TSG-RAN WG1 Meeting #96, Feb. 25-Mar. 1, 2019, R1-1903469, 14 pages.

Samsung, "On Beam Management, Measurement and Reporting", 3GPP TSG RAN WG1 NR AH#3, Sep. 18-21, 2017, R1-1715940, 15 pages.

International Search Report dated Nov. 18, 2020 in connection with International Patent Application No. PCT/KR2020/011095, 3 pages.

AT&T, "On beam recovery for partial and full control channel failure", 3GPP TSG RAN WG1 Meeting NR#3, Sep. 18-21, 2017, R1-1716690, 7 pages.

Intel Corporation, "Summary of simultaneous Rx and Tx", 3GPP TSG RAN WG1 Meeting #94, Aug. 20-24, 2018, R1-1809768, 16 pages.

Supplementary European Search Report dated Jul. 19, 2022 in connection with European Patent Application No. 20 85 4914, 9 pages.

* cited by examiner

METHOD AND APPARATUS FOR INDICATING BEAM FAILURE RECOVERY OPERATION OF TERMINAL IN WIRELESS COMMUNICATION SYSTEM

CROSS-REFERENCE TO RELATED APPLICATION

This application is based on and claims priority under 35 U.S.C. 119 to Korean Patent Application No. 10-2019-0102008, filed on Aug. 20, 2019, in the Korean Intellectual Property Office, the disclosure of which is herein incorporated by reference in its entirety.

BACKGROUND

1. Field

The disclosure relates to a wireless communication system and, more specifically, to a method and an apparatus for a beam failure recovery (BFR) operation of a terminal.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

Embodiments disclosed herein may provide a method and an apparatus for a beam failure recovery (BFR) of a terminal in a wireless communication system.

An aspect of a method of a terminal is to solve the problems described above, and the method includes: receiving, from a base station, information on a reference signal set for beam failure detection; identifying the reference signal set for beam failure detection based on the information; identifying whether a beam failure is detected based on the reference signal set; and in case that the beam failure is detected for the reference signal set, triggering a beam failure recovery procedure.

In addition, an aspect of a method of a base station is to solve the problems described above, and the method includes: generating information on a reference signal set for beam failure detection; transmitting, to a terminal, the information on the reference signal set; and in case that a beam failure is detected for the reference signal set, receiving, from the terminal, a signal for beam failure recovery.

In addition, an aspect of a terminal is to solve the problems described above, and the terminal includes: a transceiver; and a controller, wherein the controller is configured to: receive, from a base station, information on a reference signal set for beam failure detection; identify the reference signal set for beam failure detection, based on the information, identify whether a beam failure is detected based on the reference signal set, and in case that the beam failure is detected for the reference signal set, trigger a beam failure recovery procedure.

In addition, an aspect of a base station is to solve the problems described above, and the base station includes: a transceiver; and a controller, wherein the controller is configured to: generate information on a reference signal set for beam failure detection, transmit, to a terminal, the information on the reference signal set, and in case that a beam failure is detected for the reference signal set, receive, from the terminal, a signal for beam failure recovery.

The disclosure provides a method for efficiently performing a beam failure recovery (BFR) operation of a terminal in a wireless communication system. Therefore, a downlink reception performance of the terminal can be improved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
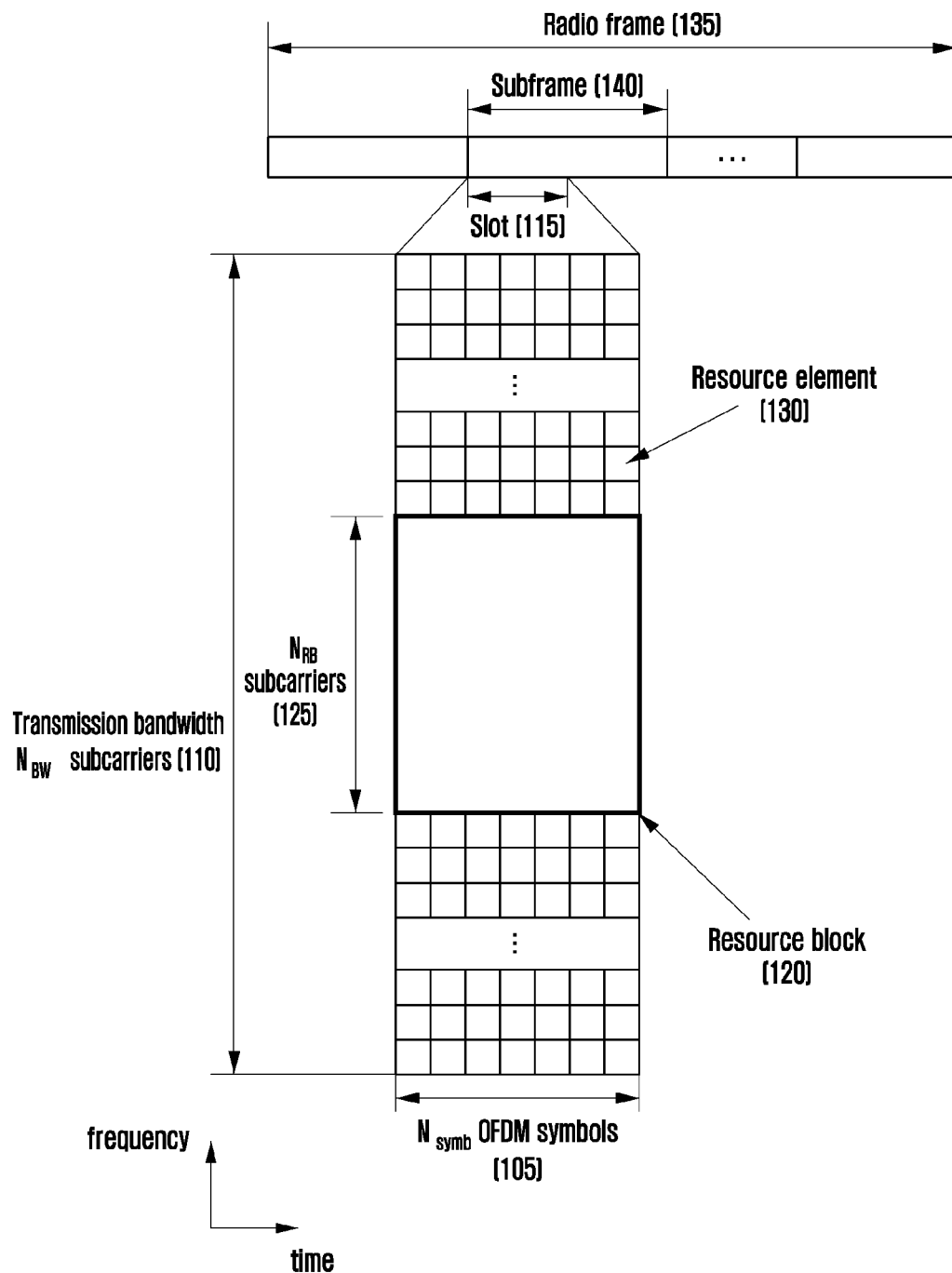
FIG. 1 illustrates a diagram of a time-frequency domain transmission structure of LTE, LTE-A, NR, or a wireless communication system similar thereto.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. Hereinafter, a base station is a subject configured to perform resource allocation to a terminal, and may be one of a gNode B, an eNode B, a Node B, a base station (BS), a wireless access unit, a base station controller, or a node on a network. A terminal may include a user equipment (UE), a mobile station (MS), a cellular phone, a smartphone, a computer, or a multimedia system capable of a communication function. However, the disclosure is not limited to the above example.

Hereinafter, the disclosure provides a technology for receiving, by a terminal, broadcasting information from a base station in a wireless communication system. The disclosure relates to a communication scheme and system of converging an IoT technology and a 5G communication system for supporting a higher data transfer rate beyond a 4G system. The disclosure may be applied to intelligent services (e.g. smart home, smart building, smart city, smart car or connected car, health care, digital education, smart retail, and security and safety services), based on a 5G communication technology and an IoT-related technology.

In the following description, terms referring to broadcast information, terms referring to control information, terms associated with communication coverage, terms referring to state changes (e.g., event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

A wireless communication system has developed to be a broadband wireless communication system that provides a high speed and high quality packet data service, like the communication standards, such as high speed packet access (HSPA), LTE or evolved universal terrestrial radio access (E-UTRA), LTE-advanced (LTE-A), and LTE-Pro of 3GPP, high rate packet data (HRPD), and ultra-mobile broadband (UMB) of 3GPP2, 802.16e of IEEE, and the like, beyond the voice-based service provided at the initial stage.

An LTE system, which is a representative example of a broadband wireless communication system, employs an orthogonal frequency division multiplexing (OFDM) scheme for a downlink (DL), and employs a single carrier frequency division multiple access (SC-FDMA) scheme for an uplink (UL). Uplink denotes a wireless link for transmitting data or a control signal by a terminal (UE or MS) to a base station (eNode B or base Station (BS)), and downlink denotes a wireless link for transmitting data or a control signal by a base station to a terminal. In the multiple access schemes described above, time-frequency resources for carrying data or control information are allocated and managed in a manner to prevent overlapping of the resources between users, i.e. to establish the orthogonality, so as to identify data or control information of each user.

A future communication system after LTE, that is, a 5G communication system, is required to freely apply various requirements from a user, a service provider, and the like, and thus support a service satisfying all the various requirements. Services considered for 5G communication systems may include enhanced mobile broadband (eMBB), massive machine type communication (mMTC), ultra-reliability low-latency communication (URLLC).

According to embodiments, the purpose of eMBB is to provide a data transfer rate faster than a data transfer rate supported by the conventional LTE, LTE-A, or LTE-Pro. For example, in a 5G communication system, eMBB is required to provide a peak data rate of 10 Gbps for uplink and a peak data rate of 20 Gbps for downlink in view of a single base station. At the same time, eMBB is required to provide an increased user perceived data rate of a terminal. In order to satisfy the requirements described above, a 5G communication system requires the improvement of a transmission/reception technology including further enhanced multi input multi output (MIMO) transmission technology. In addition, while current LTE uses a band of 2 GHz, a 5G communication system uses a frequency bandwidth greater than 20 MHz in a frequency band of 3-6 GHz or a frequency band of 6 GHz or greater to satisfy a data transfer rate required for the 5G communication system.

Meanwhile, in a 5G communication system, mMTC has been considered to support application services such as the Internet of Things (IoT). mMTC may require the support of massive terminal access in a cell, the improvement of terminal coverage, improved battery lifetime, terminal cost reduction, etc. in order to efficiently provide the Internet of Things. Since the Internet of Things is mounted in various sensors and devices to provide communication functions, mMTC is required to support a large number of terminals (e.g. 1,000,000 terminals/km2) in a cell. Also, a terminal supporting mMTC may require a wider coverage compared to other services provided in a 5G communication system because the terminal is highly probable, due to the nature of mMTC, to be disposed in a radio shadow area such as the basement of a building, which a cell fails to cover. A terminal supporting mMTC may be required to be inexpensive and have a very long battery lifetime because it is hard to often change the battery of the terminal.

Lastly, URLLC is a cellular-based wireless communication service that is mission-critically used, for example, in remote control for robots or machinery, industrial automation, unmanned aerial vehicles, remote health care, emergency alerts, etc. Therefore, URLLC is required to provide communication providing ultra-low latency and ultra-high reliability. For example, a service supporting URLLC is required to satisfy a wireless connection latency time (air interface latency) smaller than 0.5 milliseconds and a packet error rate of 10-5 or smaller at the same time. Therefore, for services supporting URLLC, a 5G system requires a design for providing a transmission time interval (TTI) shorter than those of other services and allocating a wide domain of resources in a frequency band. mMTC, URLLC, and eMBB as described above merely correspond to examples of different service types, and service types to which the disclosure may be applied are limited to these examples.

The services considered in 5G communication systems, as described above, are required to be converged to each other, based on a single framework, and then be provided. That is, in order to efficiently manage and control resources, it is required to integrate the services as a single system and control and transmit the integrated services, rather than independently operate each of the services.

In addition, hereinafter, an embodiment will be described based on an example of LTE, LTE-A, LTE Pro, or NR systems, but an embodiment may be also applied to another communication system having a similar technical background or channel type. Moreover, an embodiment may be also applied to another communication system through partial modification without departing from the scope of the disclosure through a determination of a person skilled in the art. Hereinafter, a frame structure of LTE, LTE-A, and 5G systems will be described with reference to the drawings, and the direction of 5G system design will be described.

FIG. 1 illustrates a diagram of a time-frequency domain transmission structure of LTE, LTE-A, NR, or a wireless communication system similar thereto.

FIG. 1 illustrates a basic structure of a time-frequency resource domain that is a wireless resource region in which data or a control channel of LTE, LTE-A, and NR systems based on cyclic prefix (CP) OFDM (CP-OFDM) or single carrier-frequency division multiple access (SC-FDMA) waveforms is transmitted.

In FIG. 1, the transverse axis indicates a time domain, and the longitudinal axis indicates a frequency domain. Uplink (UL) may imply a wireless link through which a terminal transmits data or a control signal to a base station, and downlink (DL) may imply a wireless link through which a base station transmits data or a control signal to a terminal.

A minimum transmission unit in a time domain of LTE, LTE-A, and NR systems is an OFDM symbol or an SC-FDMA symbol, and Nsymb symbols 105 may configure a single slot 115. In LTE and LTE-A, two slots each including seven symbols (Nsymb=7) may configure a single subframe 140. In addition, according to embodiments, 5G may support two types of slot structures which are a slot and a mini-slot (or a non-slot). Nsymb of a 5G slot may be 7 or 14, and Nsymb of a 5G mini-slot may be configured to be one of 1, 2, 3, 4, 5, 6, or 7. In LTE and LTE-A, the length of the slot is 0.5 ms, and the length of the subframe is fixed to be 1.0 ms. However, in NR systems, the length of the slot or the mini-slot may be flexibly changed according to subcarrier spacing. In LTE and LTE-A, a radio frame 135 is a time domain unit including 10 subframes. In LTE and LTE-A, a minimum transmission unit in a frequency domain is a 15 kHz subcarrier (subcarrier spacing=15 kHz), and the entire system transmission bandwidth is configured by a total of NBW subcarriers 110. A flexible extended frame structure of NR systems will be described later.

A basic unit of resources in the time-frequency domain is a resource element RE 130, which may be represented by an OFDM symbol or SC-FDMA symbol index and a subcarrier index. A resource block (RB) (or a physical resource block PRB) 120 may be defined as Nsymb number of consecutive OFDM symbols or SC-FDMA symbols 105 in the time domain, and NRB number of consecutive subcarriers 125 in the frequency domain. Therefore, the one RB 120 is configured by Nsymb×NRB number of REs 130. In LTE and LTE-A systems, data is mapped in units of RBs, and a base station performs scheduling for a predetermined terminal in units of RB-pairs each configuring a single subframe.

Nsymb, which is the number of SC-FDMA symbols or OFDM symbols, is determined according to the length of a cyclic prefix (CP) added to each of the symbols to prevent interference between the symbols. For example, if a normal CP is applied, Nsymb is 7, and if an extended CP is applied, Nsymb is 6. An extended CP is applied to a system having a relatively larger radio transmission distance, compared to a normal CP, so as to maintain orthogonality between symbols.

According to embodiments, each of subcarrier spacing, CP length, etc. is essential information for OFDM transmission/reception, and is required to be recognized as the same value by a base station and a terminal, so that smooth transmission or reception is possible.

A frame structure of LTE and LTE-A systems, as described above, is designed in consideration of common voice/data communication. Therefore, the expandability of the frame structure is constrained and insufficient to satisfy various services and requirements as in NR systems. Therefore, NR systems are required to flexibly define a frame structure and operate the frame structure in consideration of various services and requirements.

Figure 2:
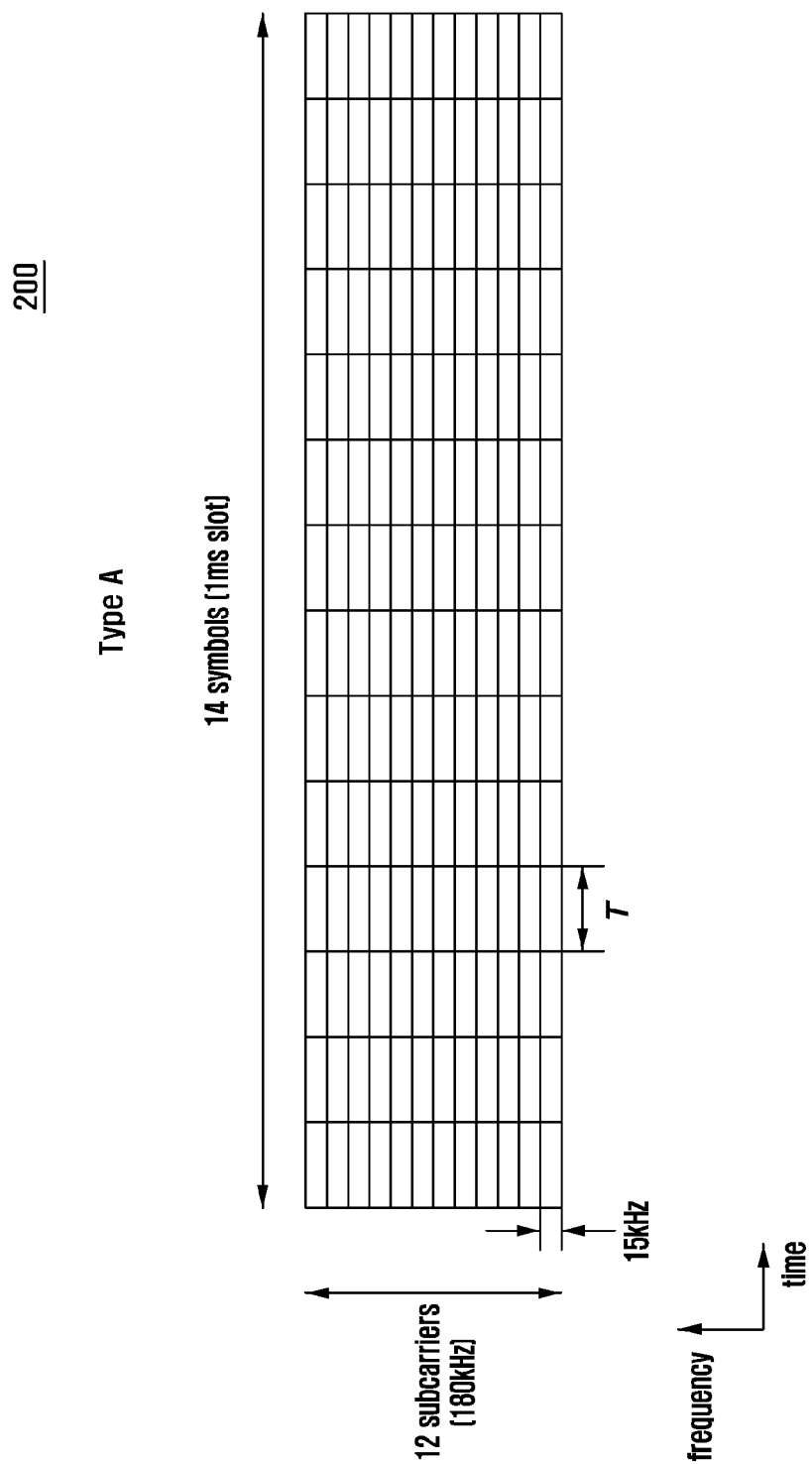
FIG. 2 illustrates an example of an extended frame structure according to embodiments.
Figure 3:
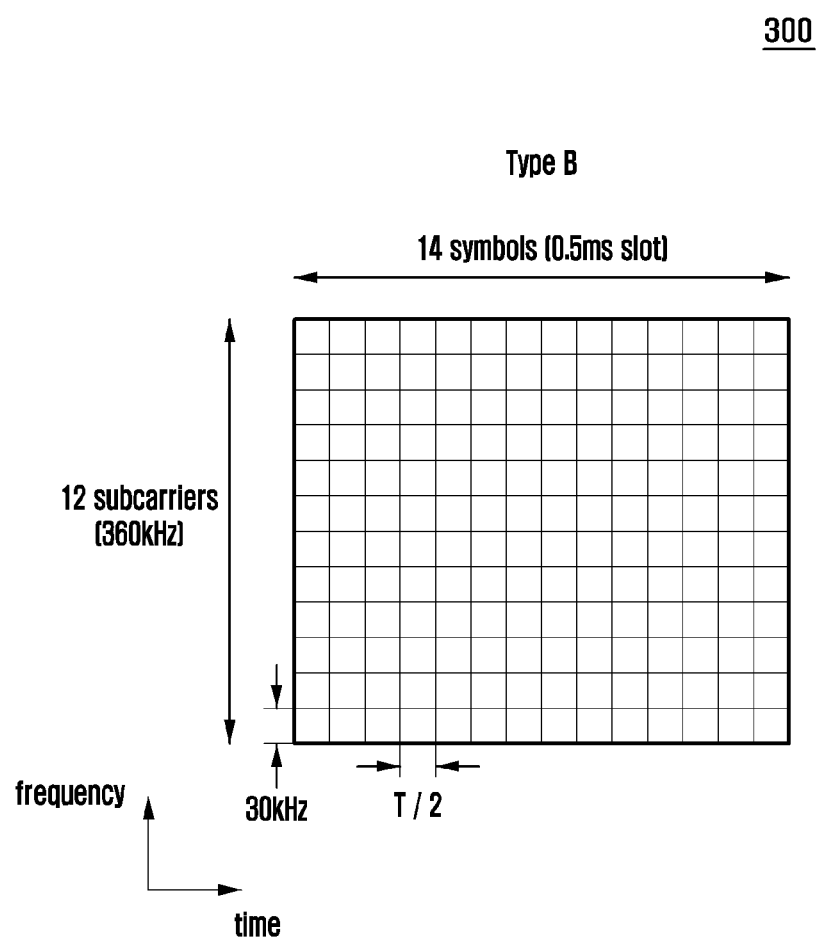
FIG. 3 illustrates another example of an extended frame structure according to embodiments.
Figure 4:
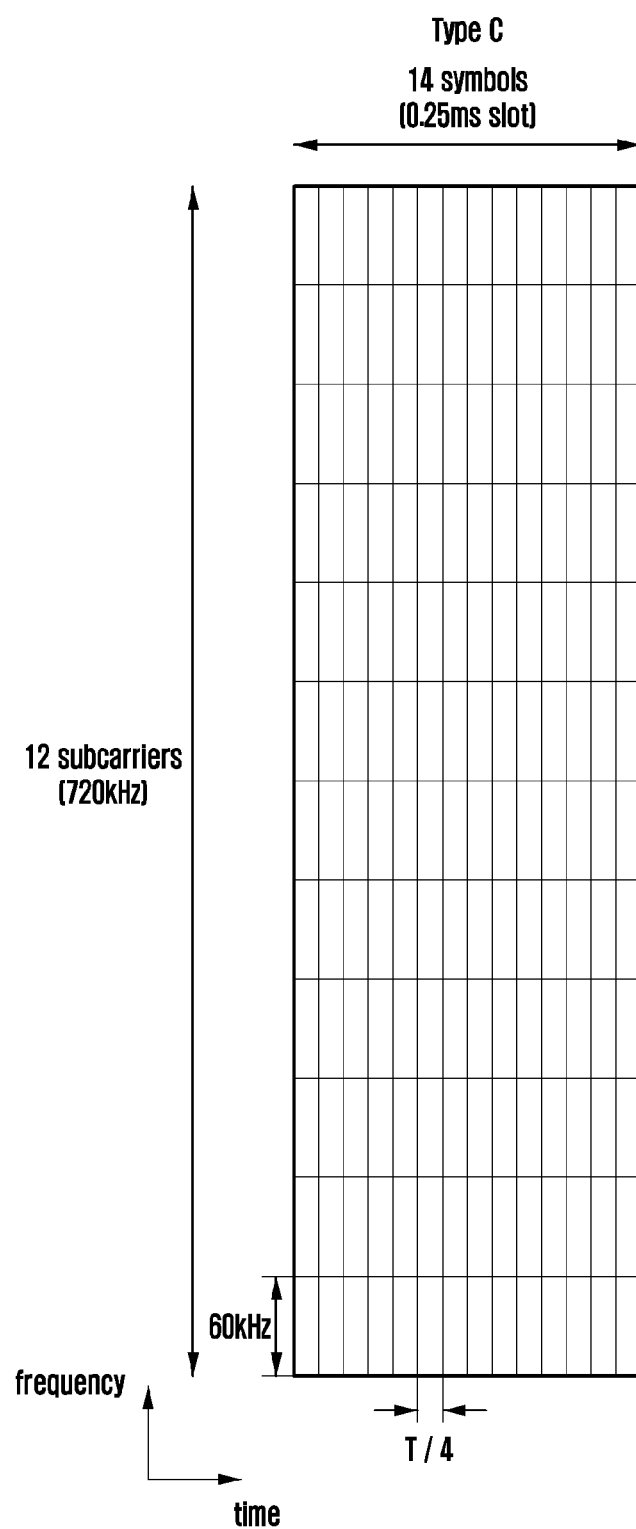
FIG. 4 illustrates yet another example of an extended frame structure according to embodiments.

FIG. 2 illustrates an extended frame structure according to embodiments, FIG. 3 illustrates an extended frame structure according to embodiments, and FIG. 4 illustrates an extended frame structure according to embodiments.

In the examples illustrated in FIGS. 2 to 4, subcarrier spacing, CP length, slot length, etc. may be expressed as an essential parameter set defining an extended frame structure.

In the initial stage of introducing a 5G system in the future, at least one of the coexistence of the 5G system with a conventional LTE/LTE-A system, or a dual mode operation is expected. Through the coexistence or dual mode operation, the conventional LTE/LTE-A system may provide a stable system operation, and the 5G system may function to provide an enhanced service. Therefore, an extended frame structure of a 5G system is required to include at least one of an LTE/LTE-A frame structure or an essential parameter set.

FIG. 2 illustrates an example of an extended frame structure according to embodiments.

FIG. 2 illustrates a 5G frame structure that is identical to an LTE/LTE-A frame structure, or an essential parameter set. In frame structure type A 200 illustrated in FIG. 2, the subcarrier spacing is 15 kHz, 14 symbols constitute a 1 ms slot, and a PRB includes 12 subcarriers (=180 kHz=12×15 kHz).

FIG. 3 illustrates another example of an extended frame structure according to embodiments.

Referring to FIG. 3, in frame structure type B 300 illustrated in FIG. 3, the subcarrier spacing is 30 kHz, 14 symbols constitute a 0.5 ms slot, and a PRB includes 12 subcarriers (=360 kHz=12×30 kHz). That is, in frame structure type B, the subcarrier spacing and the PRB size are 2 times bigger and the slot length and the symbol length are 2 times smaller, compared to frame structure type A.

FIG. 4 illustrates yet another example of an extended frame structure according to embodiments.

Referring to FIG. 4, in frame structure type C 400 illustrated in FIG. 4, the subcarrier spacing is 60 kHz, 14 symbols constitute a 0.25 ms slot, and a PRB includes 12 subcarriers (=720 kHz=12×60 kHz). That is, in frame structure type C, the subcarrier spacing and the PRB size are 4 times bigger and the slot length and the symbol length are 4 times smaller, compared to frame structure type A.

That is, the frame structure types are generalized such that each of subcarrier spacing, CP length, slot length, etc., which are included in an essential parameter set, has an integer multiple relationship between the frame structure types. Therefore, high expandability can be provided.

Furthermore, in order to express a reference time unit regardless of the frame structure types, a subframe having a fixed length of 1 ms may be defined. Therefore, in frame structure type A, one subframe is configured by one slot, in frame structure type B, one subframe is configured by two slots, and in frame structure type C, one subframe is configured by four slots. An extensible frame structure is naturally not limited to frame structure types A, B, and C described above, and may also be applied to another subcarrier spacing, such as 120 kHz and 240 kHz, and may have a different structure.

According to embodiments, the frame structure types described above may be applied to correspond to various scenarios. In view of cell sizes, the longer the CP length, the larger the cell that can be supported. Therefore, frame structure type A is able to support a relatively larger cell compared to frame structure types B and C. In view of operating frequencies, the larger the subcarrier spacing, the more advantageous the restoration of phase noise in a high frequency band is. Therefore, frame structure type C is able to support a relatively higher operating frequency compared to frame structure types A and B. In view of services, a short subframe length is advantageous to support ultra-low latency services, such as URLLC. Therefore, frame structure type C is relatively more suitable for URLLC service compared to frame structure types A and B.

In addition, several frame structure types may be multiplexed in a single system so as to be integrally operated.

In NR, one component carrier (CC) or serving cell can be configured by a maximum of 250 or more RBs. Therefore, if a terminal always receives the entire serving cell bandwidth as in LTE, the power consumption of the terminal may be enormous. In order to solve the problem, a base station can configure one or more bandwidth parts (BWPs) for the terminal to support the terminal to change a reception region in a cell. In NR, a base station may configure "an initial BWP", which is a bandwidth of CORESET #0 (or a common search space (CSS)), for a terminal through MIB. After the configuration, the base station may configure a first BWP of the terminal through RRC signaling, and may notify of at least one piece of BWP configuration information which may be indicated through DCI later. After the notification, the base station may notify of a BWP ID through DCI to indicate a band which the terminal is to use. If the terminal fails to receive DCI in a currently allocated BWP for a particular time interval or longer, the terminal returns to "a default BWP" and then attempts to receive DCI.

Figure 5:
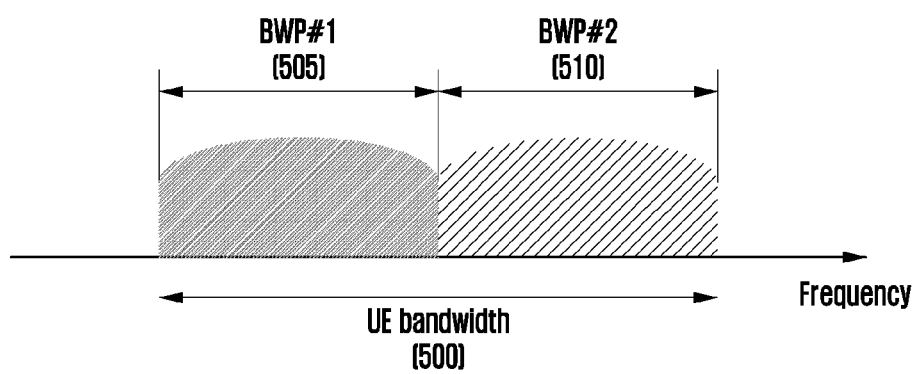
FIG. 5 illustrates a diagram of an example of a configuration relating to a bandwidth part in a 5G communication system according to embodiments.

FIG. 5 illustrates a diagram of an example of a configuration relating to a bandwidth part in an NR communication system according to embodiments.

Referring to FIG. 5, a terminal (UE) bandwidth 500 may be configured to be divided into two bandwidth parts, that is, bandwidth part #1 505 and bandwidth part #2 510. A base station may configure one bandwidth part or a plurality of bandwidth parts for a terminal and may configure pieces of information below for each bandwidth part.

TABLE 1

Configuration information 1: the bandwidth of a bandwidth part (the number of PRBs constituting a bandwidth part)
Configuration information 2: the frequency position of a bandwidth part (this information is represented as an offset value relative to a reference point, wherein the reference point may include, for example, the center frequency of a carrier, a synchronization signal, a synchronization signal raster, etc.)
Configuration information 3: the numerology of a bandwidth part (e.g. subcarrier spacing, CP length, etc.)
Others In addition to the pieces of configuration information shown in [Table 1], various parameters related to a bandwidth part may be configured for a terminal. Pieces of configuration information may be transferred by a base station to a terminal through higher layer signaling, for example, RRC signaling. At least one bandwidth part among the configured one bandwidth part or plurality of bandwidth parts may be activated. Whether the configured bandwidth part is activated may be dynamically transferred through an MAC control element (CE) or DCI, or semi-statically transferred through RRC signaling by a base station to a terminal.

A configuration relating to a bandwidth part supported in a 5G communication system may be used for various purposes.

For example, if a bandwidth supported by a terminal is smaller than a system bandwidth, the terminal may be supported through a bandwidth part configuration. For example, the frequency position (configuration information 1) of a bandwidth part in [Table 1] may be configured for the terminal so that the terminal transmits or receives data at a particular frequency position in a system bandwidth.

As another example, a base station may configure a plurality of bandwidth parts for a terminal in order to support different numerologies. For example, in order to support, for a terminal, data transmission/reception using both a subcarrier spacing of 15 KHz and a subcarrier spacing of 30 KHz, a base station may configure the terminal to use two bandwidth parts having a subcarrier spacing of 15 KHz and a subcarrier spacing of 30 KHz, respectively. Different bandwidth parts may be frequency-division-multiplexed (FDM), and if data is to be transmitted or received at a particular subcarrier spacing, a bandwidth part configured to have the subcarrier spacing may be activated.

As another example, a base station may configure bandwidth parts having different bandwidths for a terminal in order to reduce the power consumption of the terminal. For example, if the terminal supports a very wide bandwidth, for example, a bandwidth of 100 MHz, and always transmits or receives data through the bandwidth, the terminal may consume a very large quantity of power. Particularly, it is very inefficient in view of power consumption for a terminal to monitor an unnecessary downlink control channel in a large bandwidth of 100 MHz under no traffic. Therefore, in order to reduce the power consumption of a terminal, a base station may configure a bandwidth part having a relatively small bandwidth, for example, a bandwidth part having 20 MHz for the terminal. If there is no traffic, the terminal may monitor a 20 MHz bandwidth part, and if data is generated, the terminal may transmit or receive the data by using a 100 MHz bandwidth part according to an indication of the base station.

Figure 6:
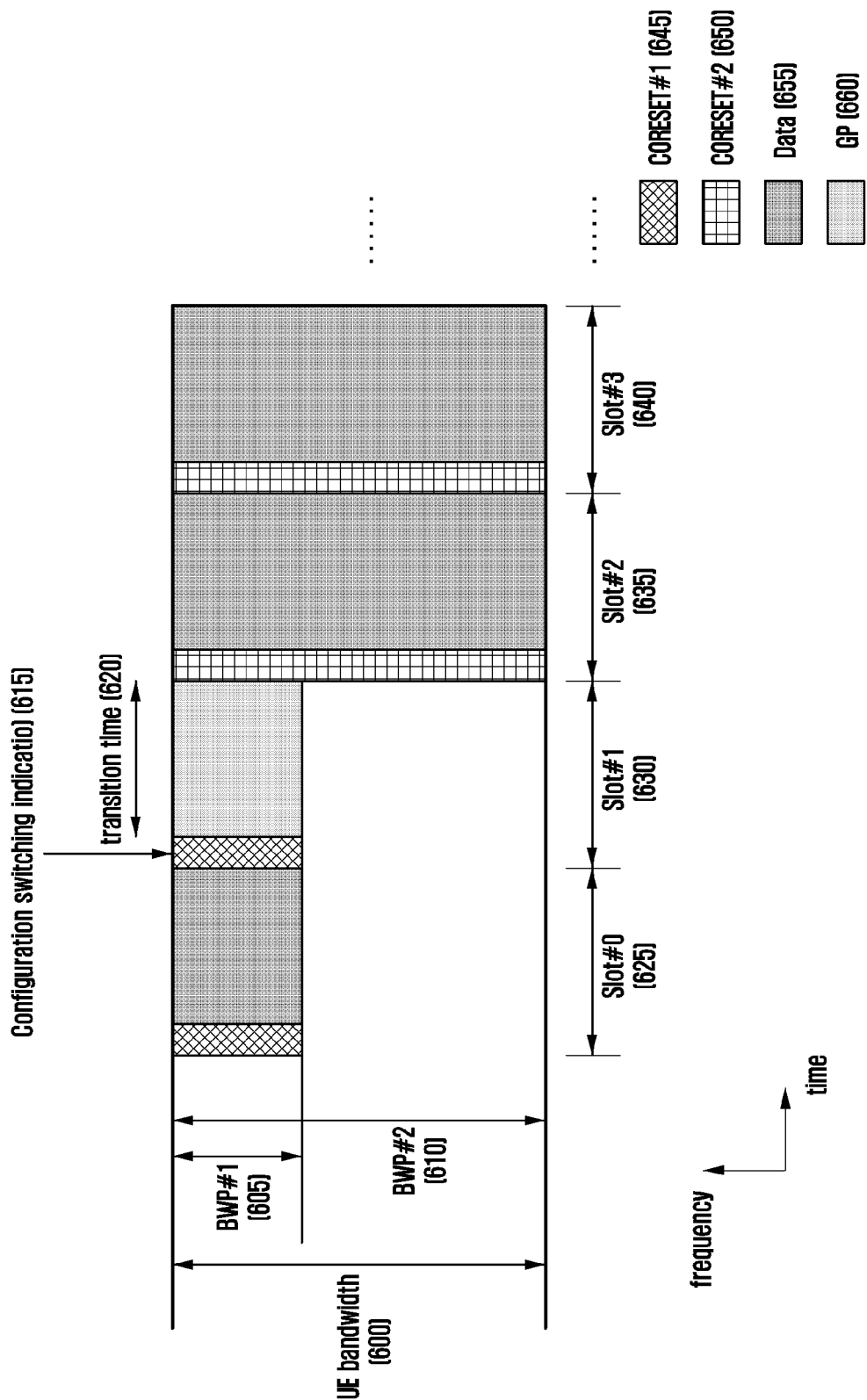
FIG. 6 illustrates a diagram of a method for indicating and changing a bandwidth part according to embodiments.

FIG. 6 illustrates a diagram of a method for dynamically indicating and changing a configuration of a bandwidth part according to embodiments.

As described with reference to [Table 1], a base station may configure one or multiple bandwidth parts for a terminal, and may notify the terminal of information relating to the bandwidth, frequency position, and numerology of each bandwidth part through a configuration relating to each bandwidth part.

Referring to FIG. 6, two bandwidth parts including bandwidth part #1 (BPW #1) 605 and bandwidth part #2 (BWP #2) 610 may be configured for a terminal in a UE bandwidth 600. One or multiple bandwidth parts may be activated in a configured bandwidth, and FIG. 6 illustrates an example in which one bandwidth part is activated.

As illustrated in FIG. 6, bandwidth part #1 605 among the bandwidth parts configured in slot #0 625 has been activated, and the terminal may monitor a downlink control channel (a physical downlink control channel, a PDCCH) in a control region (a control resource set, CORESET)#1 645 configured in bandwidth part #1 605, and may transmit or receive data 655 in bandwidth part #1 605. A CORESET in which the terminal receives a PDCCH may change according to a bandwidth part activated among the configured bandwidth parts, and a bandwidth in which the terminal monitors a PDCCH, may be changed accordingly.

The base station may additionally transmit an indicator 615 for changing a configuration relating to a bandwidth part to the terminal. Changing of a configuration relating to a bandwidth part may be considered to be identical to an operation (e.g. an activation change from bandwidth part A to bandwidth part B) of activating a particular bandwidth part. The base station may transmit a configuration switching indicator 615 to the terminal in a particular slot, and the terminal may receive the configuration switching indicator from the base station, and then apply a changed configuration according to the configuration switching indicator from a particular time point, so as to determine a bandwidth part to be activated, and monitor a PDCCH in a CORESET configured in the activated bandwidth part.

Specifically, referring to FIG. 6, the base station may transmit, to the terminal and in slot #1 630, the configuration switching indicator 615 indicating a change of the activated bandwidth part from existing bandwidth part #1 605 to bandwidth part #2 610. After the reception of the corresponding indicator, the terminal may activate bandwidth part #2 610 according to the contents of the indicator. At the time of activation, a transition time 620 for bandwidth part change may be required, and a time point at which an activated bandwidth part is applied through a change may be determined accordingly. FIG. 6 illustrates a case where, after reception of the configuration switching indicator 615, the transition time 620 which corresponds to one slot is required. The case merely corresponds to an example, and the transition time may be determined by the unit of at least one slot or symbol. In addition, the transition time may be previously determined, or may be determined by configuration of the base station. Data transmission or reception may not be performed in the corresponding transition time 620 (as indicated by reference numeral 660). Accordingly, an operation in which bandwidth part #2 610 is activated in slot #2 635, and a control channel and data are transmitted or received in the corresponding bandwidth part may be performed.

The base station may previously configure one or multiple bandwidth parts for the terminal through higher layer signaling (e.g. RRC signaling), and may indicate activation by a method in which the configuration switching indicator 615 is mapped to one of bandwidth part configurations preconfigured by the base station. For example, an indicator having log 2N bits may select one of N number of preconfigured bandwidth parts and indicate the selected one. [Table 2] below shows an example of indicating configuration information relating to a bandwidth part by using a 2-bit indicator.

TABLE 2

| Indicator value | Bandwidth part configuration |
| --- | --- |
| 00 | Bandwidth configuration A configured by higher layer signaling |
| 01 | Bandwidth configuration B configured by higher layer signaling |
| 10 | Bandwidth configuration C configured by higher layer signaling |
| 11 | Bandwidth configuration D configured by higher layer signaling |

The configuration switching indicator 615 relating to a bandwidth part described above may be transferred from the base station to the terminal in a type of medium access control (MAC) control element (CE) signaling or L1 signaling (e.g. common DCI, group-common DCI, UE-specific DCI).

A time point from which bandwidth part activation is to be applied according to the configuration switching indicator 615 relating to a bandwidth part described above follows below. A time point from a configuration change is to be applied may follow a pre-defined value (e.g. application after passage of N(≥1) slots after a configuration switching indicator is received), may be configured for the terminal by the base station through higher layer signaling (e.g. RRC signaling), or may be transmitted after being included as a part of the contents of the configuration switching indicator 615. Otherwise, the time point may be determined by a combination of the methods. After reception of the configuration switching indicator 615 relating to a bandwidth part, the terminal may apply a changed configuration from a time point obtained by a method described above.

NR provides specific frequency domain resource allocation methods (FD-RAs) as below in addition to frequency domain resource candidate allocation through BWP indication.

Figure 7:
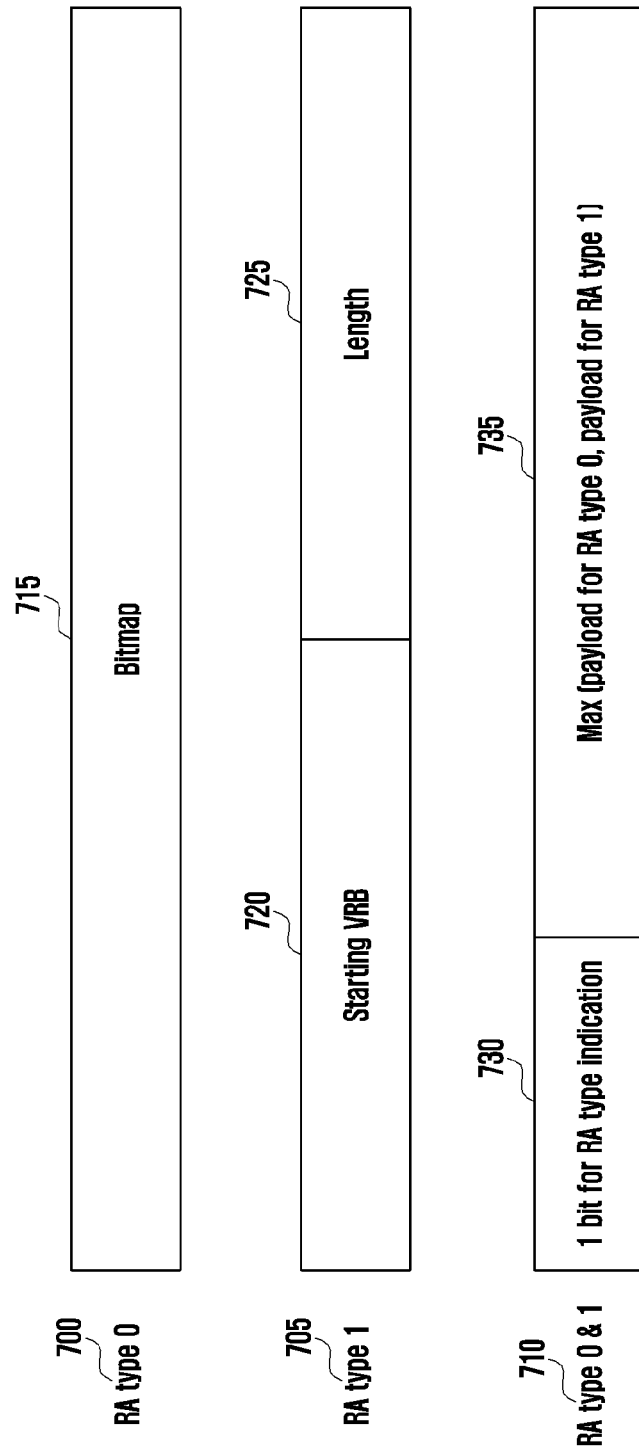
FIG. 7 illustrates a diagram of an example of allocating frequency domain resources for a PDSCH or a PUSCH according to embodiments.

FIG. 7 illustrates a diagram of an example of allocating frequency domain resources for a physical downlink shared channel (PDSCH) or a physical uplink shared channel (PUSCH) according to embodiments.

FIG. 7 illustrates three frequency domain resource allocation methods including type 0 700, type 1 705, and a dynamic switch 710 which can be configured through a higher layer in NR.

If a terminal is configured to use only resource type 0 through higher layer signaling (as indicated by reference numeral 700), partial downlink control information (DCI) allocating a PDSCH or a PUSCH to the terminal has a bitmap configured by NRBG number of bits. The conditions for the same will be described later. NRBG implies the number of resource block groups (RBGs) determined, as shown in [Table 3] below, according to an rbg-Size, which is a higher layer parameter, and a BWP size allocated by a BWP indicator, and data is transmitted on a RBG indicated by number 1 through the bitmap.

TABLE 3

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

If a terminal is configured to use only resource type 1 through higher layer signaling (as indicated by reference numeral 705), partial DCI allocating a PDSCH or a PUSCH to the terminal has frequency domain resource allocation information configured by $\lceil \log_2(N_{RB}^{DL,BWP}(N_{RB}^{DL,BWP}+1)/2) \rceil$ number of bits. The conditions for the same will be described later. A base station is able to configure, through the information, a starting VRB 720 and the length 725 of a frequency domain resource continuously allocated from the starting VRB.

If a terminal is configured to use both resource type 0 and resource type 1 through higher layer signaling (as indicated by reference numeral 710), partial DCI allocating a PDSCH or a PUSCH to the terminal has frequency domain resource allocation information configured by bits of a bigger value 735 among a payload 715 for configuring resource type 0 and a payload 720 and 725 for configuring resource type 1.

The conditions for the same will be described later. A bit is added to the foremost part (an MSB) of the frequency domain resource allocation information in the DCI, and the bit indicates that resource type 0 is used if the bit is 0, and resource type 1 is used if the bit is 1.

Figure 8:
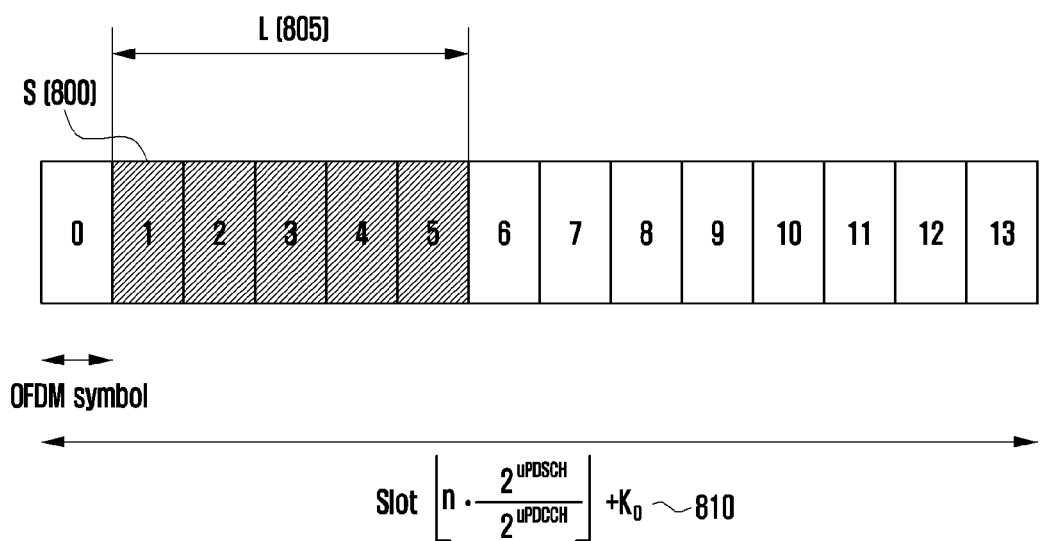
FIG. 8 illustrates a diagram of an example of allocating time domain resources for a PDSCH or a PUSCH according to embodiments.

FIG. 8 illustrates a diagram of an example of allocating time domain resources for a PDSCH or a PUSCH according to embodiments.

Referring to FIG. 8, a base station is able to indicate the time-axis position of PDSCH resources according to subcarrier spacing of a data channel and a control channel configured through higher layer signaling, a scheduling offset ($K_0$ or $K_2$) value, and a starting position 800 and a length 805 in OFDM symbols of one slot, dynamically indicated through DCI.

NR provides various DCI formats as shown in [Table 4] according to purposes in order for a terminal to efficiently receive a control channel.

TABLE 4

| DCI format | Usage |
| --- | --- |
| 0_0 | Scheduling of PUSCH in one cell |
| 0_0 | Scheduling of PUSCH in one cell |
| 1_0 | Scheduling of PUSCH in one cell |
| 1_1 | Scheduling of PUSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, a base station may use DCI format 1_0 or DCI format 1_1 in order to allocate (schedule) a PDSCH in one cell.

If DCI format 1_0 is transmitted together with a CRC scrambled by a cell radio network temporary identifier (C-RNTI), a configured scheduling RNTI (CS-RNTI), or an MCS-C-RNTI, DCI format 1_0 includes at least pieces of information as below.

Identifier for DCI formats (1 bit): the information is always configured to be 1 as a DCI format indicator.

Frequency domain resource assignment ($\lceil \log_2(N_{RB}^{DL,BWP}(N_{RB}^{DL,BWP}+1)/2) \rceil$ bits): the information indicates frequency domain resource allocation, and if DCI format 1_0 is monitored in a UE-specific search space, $N_{RB}^{DL,BWP}$ is the size of an active DL BWP, and otherwise, $N_{RB}^{DL,BWP}$ is the size of an initial DL BWP. For the detailed methods, see the frequency domain resource allocation described above.

Time domain resource assignment (4 bits): the information indicates time domain resource allocation according to the description described above.

VRB-to-PRB mapping (1 bit): if the information is 0, non-interleaved VRB-to-PRB mapping is indicated, and if the information is 1, interleaved VRB-to-PRB mapping is indicated.

Modulation and coding scheme (5 bits): the information indicates a modulation order and a coding rate used for PDSCH transmission.

New data indicator (1 bit): the information indicates whether a PDSCH corresponds to initial transmission or retransmission, according to whether the indicator has been toggled.

Redundancy version (2 bits): the information indicates a redundancy version used for PDSCH transmission.

HARQ process number (4 bits): the information indicates an HARQ process number used for PDSCH transmission.

Downlink assignment index (2 bits): a DAI indicator.

TPC command for scheduled PUCCH (2 bits); a PUCCH power control indicator.

PUCCH resource indicator (3 bits): the information is a PUCCH resource indicator, and indicates one of eight types of resources configured through a higher layer.

PDSCH-to-HARQ_feedback timing indicator (3 bits): the information is an HARQ feedback timing indicator, and indicates one of eight types of feedback timing offsets configured through a higher layer.

If DCI format 1_1 is transmitted together with a CRC scrambled by a C-RNTI, a CS-RNTI, or an MCS-C-RNTI, DCI format 1_1 includes at least pieces of information as below.

Identifier for DCI formats (1 bit): the information is always configured to be 1 as a DCI format indicator.

Carrier indicator (0 or 3 bits): the information indicates a CC (or a cell) in which a PDSCH allocated by corresponding DCI is transmitted.

Bandwidth part indicator (0, 1, or 2 bits): the information indicates a BWP in which a PDSCH allocated by corresponding DCI is transmitted.

Frequency domain resource assignment (a payload is determined according to the frequency domain resource assignment); the information indicates frequency domain resource allocation, and $N_{RB}^{DL,BWP}$ is the size of an active DL BWP. For the detailed methods, see the frequency domain resource allocation described above.

Time domain resource assignment (4 bits): the information indicates time domain resource allocation according to the description described above.

VRB-to-PRB mapping (0 or 1 bit): if the information is 0, non-interleaved VRB-to-PRB mapping is indicated, and if the information is 1, interleaved VRB-to-PRB mapping is indicated. If frequency domain resource allocation is configured to be resource type 0, the information is 0 bits.

PRB bundling size indicator (0 or 1 bit): if prb-BundlingType, which is a higher layer parameter, is not configured, or configured to be "static", the information is 0 bits, and if prb-BundlingType is configured to be "dynamic", the information is 1 bit.

Rate matching indicator (0, 1, or 2 bits): the information indicates a rate matching pattern.

ZP CSI-RS trigger (0, 1, or 2 bits); an indicator triggering an aperiodic ZP CSI-RS.

For transport block 1,
  Modulation and coding scheme (5 bits): the information indicates a modulation order and a coding rate used for PDSCH transmission.
  New data indicator (1 bit): the information indicates whether a PDSCH corresponds to initial transmission or retransmission, according to whether the indicator has been toggled.
  Redundancy version (2 bits): the information indicates a redundancy version used for PDSCH transmission.

For transport block 2,
  Modulation and coding scheme (5 bits): the information indicates a modulation order and a coding rate used for PDSCH transmission.
  New data indicator (1 bit): the information indicates whether a PDSCH corresponds to initial transmission or retransmission, according to whether the indicator has been toggled.
  Redundancy version (2 bits): the information indicates a redundancy version used for PDSCH transmission.
  HARQ process number (4 bits): the information indicates an HARQ process number used for PDSCH transmission.

Downlink assignment index (0, 2, or 4 bits): a DAI indicator.

TPC command for scheduled PUCCH (2 bits); a PUCCH power control indicator.

PUCCH resource indicator (3 bits): the information is a PUCCH resource indicator, and indicates one of eight types of resources configured through a higher layer.

PDSCH-to-HARQ_feedback timing indicator (3 bits): the information is an HARQ feedback timing indicator, and indicates one of eight types of feedback timing offsets configured through a higher layer.

Antenna port (4, 5, or 6 bits): the information indicates a DMRS port and a CDM group without data.

Transmission configuration indication (0 or 3 bits): a TCI indicator.

SRS request (2 or 3 bits): an SRS transmission request indicator.

CBG transmission information (0, 2, 4, 6, or 8 bits): the information is an indicator informing of whether to transmit code block groups in an allocated PDSCH. Number 0 means that a corresponding CBG is not transmitted, and number 1 means that a corresponding CBG is transmitted.

CBG flushing out information (0 or 1 bits): the information is an indicator informing of whether previous CBGs are corrupted, and if the information is 0, the CBGs may be corrupted, and if the information is 1, the CBGs are usable (combinable) at the time of retransmission reception.

DMRS sequence initialization (0 or 1 bit): a DMRS scrambling ID selection indicator.

The maximum number of pieces of DCI having different sizes, which can be received per slot in a corresponding cell by a terminal, is 4. The maximum number of pieces of DCI having different sizes and scrambled by a C-RNTI, which can be received per slot in a corresponding cell by the terminal, is 3.

In NR, the terminal performs blind decoding in a particular time/frequency region to receive a PDCCH including DCI. A base station may configure a control resource set (CORESET) and a search space for the terminal through higher layer signaling to provide a time/frequency region in which the terminal is to perform blind decoding, and a mapping method. The base station may configure a maximum of three CORESETs and a maximum of 10 search spaces for each of BWPs configured for the terminal. For example, the base station and the terminal may exchange signaling information described as below to transfer information relating to a CORESET.

| ControlResourceSet information element |
| --- |

```
-- ASN1START
-- TAG-CONTROLRESOURCESET-START
ControlResourceSet ::=       SEQUENCE {
    controlResourceSetId         ControlResourceSetId,
    frequencyDomainResources     BIT STRING (SIZE (45)),
    duration                     INTEGER (1..maxCoReSetDuration),
    cce-REG-MappingType          CHOICE {
        interleaved                  SEQUENCE {
            reg-BundleSize               ENUMERATED {n2, n3, n6},
            interleaverSize              ENUMERATED {n2, n3, n6},
            shiftIndex                   INTEGER (0..maxNrofPhysicalResourceBlocks-1)
OPTIONAL -- Need S
        },
        nonInterleaved               NULL
    },
    precoderGranularity          ENUMERATED {sameAsREG-bundle, allContiguousRBs},
    tci-StatesPDCCH-ToAddList    SEQUENCE(SIZE (1..maxNrofTCI-StatesPDCCH)) OF TCI-StateId
OPTIONAL, -- Cond NotSIB1-initialBWP
    tci-StatesPDCCH-ToReleaseList  SEQUENCE(SIZE (1..maxNrofTCI-StatesPDCCH)) OF TCI-StateId
OPTIONAL, -- Cond NotSIB1-initialBWP
    tci-PresentInDCI             ENUMERATED {enabled}
OPTIONAL, -- Need S
    pdcch-DMRS-ScramblingID      INTEGER (0..65535)
OPTIONAL, -- Need S
    ...
}
-- TAG-CONTROLRESOURCESET-STOP
-- ASN1STOP
```

The signaling information ControlResourceSet includes information relating to each CORESET. The information included in the signaling information ControlResourceSet may have meanings as below.

controlResourceSetId: the information indicates a CORESET index.

frequencyDomainResources: the information indicates frequency resource information of a CORESET. With respect to all PRBs included in a BWP, RB groups each including 6 RBs are made, and whether each of the RB groups is included in a CORESET frequency resource is indicated by 1 bit. (1: included in CORESET, 0: not included in CORESET)

duration: symbol level time resource information of a CORESET. The information has one value of 1, 2, or 3.

cce-REG-MappingType: the information indicates whether control channel elements (CCEs) mapped to a CORESET are interleaved. If a CCE is interleaved, additional information (reg-BundleSize, interleaverSize, and shiftIndex) relating to interleaving is provided.

precoderGranularity: the information indicates information relating to precoding of frequency resources of a CORESET. The size of a precoder may be the same as a resource element group (REG) bundle size, or the size of all frequency resources of a CORESET.

tci-StatePDCCH-ToAddList, tci-StatePDCCH-ToReleaseList: the information indicates an activatable transmission configuration indication (TCI) state set of a CORESET. One in an activatable transmission configuration indication (TCI) state set of a CORESET may be activated through higher layer signaling (e.g. MAC CE). If a CORESET is configured in an initial access process, a TCI state set may not be configured. A description of TCI states will be given later.

tci-PresentInDCI: the information indicates whether an indicator indicating a TCI state of a PDSCH is included in DCI transmitted through a PDCCH included in a CORESET.

Pdcch-DMRS-ScramblingID: a sequence scrambling index of a DMRS transmitted in a PDCCH included in a CORESET.

A terminal may perform blind decoding for receiving a PDCCH by referring to information relating to a CORESET, described above.

In NR, a base station may transfer, to a terminal, information relating to a quasi-co-location (QCL) relationship between antenna ports (e.g. a DMRS port of a PDSCH, a PDCCH DMRS port, or a CSI-RS port of a CSI-RS) transmitting a downlink channel, so that the terminal smoothly receives a downlink channel (e.g. a PDCCH or a PDSCH) and decodes the downlink channel. A QCL relationship between antenna ports may have one of a total of four QCL types.

"QCL-typeA": {Doppler shift, Doppler spread, average delay, delay spread}

"QCL-typeB": {Doppler shift, Doppler spread}

"QCL-typeC": {Doppler shift, average delay}

"QCL-typeD": {Spatial RX parameter}

If two different antenna ports share a part of the QCL types described above, or one antenna port refers to a part of the QCL type of the other antenna port, a terminal may assume that the two antenna ports share a parameter supported in a QCLtype, which is shared or referenced by the two antenna ports, and thus have the same values.

A base station may configure a TCI state to transfer information relating to a QCL relationship between antenna ports to a terminal. The TCI state includes information relating to one or two downlink RSs and supported QCL types. For example, the base station and the terminal may exchange signaling information described as below to transfer information relating to a TCI state.

| TCI-State information element |
| --- |
| ```
-- ASN1START
-- TAG-TCI-STATE-START
TCI-State ::=                    SEQUENCE {
    tci-StateId                      TCI-StateId,
    qcl-Type1                        QCL-Info,
    qcl-Type2                        QCL-Info
OPTIONAL, -- Need R
    ...
}
QCL-Info ::=                     SEQUENCE {
    cell                             ServCellIndex
OPTIONAL, -- Need R
    bwp-Id                           BWP-Id
OPTIONAL, -- Cond CSI-RS-Indicated
    referenceSignal                  CHOICE {
        csi-rs                           NZP-CSI-RS-ResourceId,
        ssb                              SSB-Index
    },
    qcl-Type                         ENUMERATED {typeA, typeB, typeC, typeD},
    ...
}
--TAG-TCI-STATE-STOP
--ASN1STOP
``` |

"TCI-state" included in the signaling information includes information relating to each TCI state. According to the signaling information, each TCI state includes information relating to a TCI state index and one or two types of QCL-Info (qcl-Type1 and qcl-Type2).

Qcl-Type1 or qcl-Type2 provides information relating to the index of a cell in which an RS is configured, the index (or a BWP identifier) of a BWP in which an RS is included, an RS providing information relating to a parameter supported in a QCL type according to QCL types, and one of a total of four QCL types.

For example, qcl-Type1 may have a QCL type among "QCL-typeA", "QCL-typeB", or "QCL-typeC" in the total of four QCL types, and qcl-Type2 may have "QCL-typeD". By considering an activated TCI state of an antenna port transmitting a downlink channel, a terminal may receive and decode a downlink channel, based on an RS referenced in the activated TCI state and a QCL type supported in same.

NR has a CSI framework for indicating, by a base station, measurement and reporting of channel state information (CSI) to a terminal. The CSI framework of NR may be configured by at least two elements including resource setting and report setting. Report setting may have a connection relationship with resource setting by referring to at least one ID of the resource setting.

According to an embodiment, resource setting may include information related to a reference signal (RS) for measuring channel state information by a terminal. A base station may configure at least one resource settings for a terminal. For example, the base station and the terminal may exchange signaling information described as below to transfer information relating to resource setting.

| CSI-ResourceConfig information element |
| --- |
| ```
-- ASN1START
-- TAG-CSI-RESOURCECONFIG-START
CSI-ResourceConfig ::=           SEQUENCE {
    csi-ResourceConfigId             CSI-ResourceConfigId,
    csi-RS-ResourceSetList           CHOICE {
        nzp-CSI-RS-SSB                   SEQUENCE {
            nzp-CSI-RS-ResourceSetList       SEQUENCE (SIZE (1. .maxNrofNZP-CSI-RS-
ResourceSetsPerConfig)) OF NZP-CSI-RS-ResourceSetId
OPTIONAL, -- Need R
            csi-SSB-ResourceSetList          SEQUENCE, (SIZE (1..maxNrofCSI-SSB-ResourceSetsPerConfig))
OF CSI-SSB-ResourceSetId
OPTIONAL -- Need R
        },
        csi-IM-ResourceSetList           SEQUENCE (SIZE (1..maxNrofCSI-IM-ResourceSetsPerConfig)) OF
CSI-IM-ResourceSetId
    },
    bwp-Id                           BWP-Id,
    resourceType                     ENUMERATED { aperiodic, semiPersistent, periodic },
    ...
}
-- TAG-CSI-RESOURCECONFIG-STOP
-- ASN1STOP
``` |

The signaling CSI-ResourceConfig may include information relating to each resource setting. According to the signaling information, each resource setting may include a resource setting index (or an identifier) (csi-ResourceConfigId), a BWP index (or an identifier) (bwp-ID), time domain transmission configuration of resources (resourceType), or a resource set list (csi-RS-ResourceSetList) including at least one resource set.

Time domain transmission configuration of resources may be configured to be aperiodic transmission, semi-persistent transmission, or periodic transmission.

A resource set list may be a set including resource sets for channel measurement, or a set including resource sets for interference measurement. If a resource set list is a set including resource sets for channel measurement, each resource set may include at least one resource, and the at least one resource may correspond to an index of a CSI reference signal (CSI-RS) resource or a synchronization/broadcast channel block (SS/PBCH block, SSB). If a resource set list is a set including resource sets for interference measurement, each resource set may include at least one interference measurement resource (CSI interference measurement, CSI-IM). For example, if a resource set includes a CSI-RS, a base station and a terminal may exchange signaling information described as below to transfer information relating to the resource set.

| NZP-CSI-RS-ResourceSet information element |
| --- |
| -- ASN1START<br>-- TAG-NZP-CSI-RS-RESOURCESET-START<br>NZP-CSI-RS-ResourceSet ::= SEQUENCE {<br>   nzp-CSI-ResourceSetId    NZP-CSI-RS-ResourceSetId,<br>   nzp-CSI-RS-Resources    SEQUENCE (SIZE (1..maxNrofNZP-CSI-RS-ResourcesPerSet)) OF NZP-CSI-RS-ResourceId,<br>   repetition    ENUMERATED { on, off }<br>   OPTIONAL, -- Need S<br>   aperiodicTriggeringOffset    INTEGER(0..6)<br>   OPTIONAL, -- Need S<br>   trs-Info    ENUMERATED {true}<br>   OPTIONAL, --Need R<br>   ...<br>}<br>-- TAG-NZP-CSI-RS-RESOURCESET-STOP<br>-- ASN1STOP |

The signaling information NZP-CSI-RS-ResourceSet includes information relating to each resource set. According to the signaling information, each resource set may include at least information relating to a resource set index (or an identifier) (nzp-CSI-ResourceSetId) and/or a CSI-RS index (or an identifier) set (nzp-CSI-RS-Resources). Further, each resource set may include a part of information (repetition) relating to a spatial domain transmission filter of a CSI-RS resource, and/or information (trs-Info) relating to whether a CSI-RS resource has a tracking purpose.

A CSI-RS may be the most representative reference signal included in a resource set. A base station and a terminal may exchange signaling information described as below to transfer information relating to a CSI-RS resource.

| NZP-CSI-RS-Resource information element |
| --- |
| -- ASN1START<br>-- TAG-NZP-CSI-RS-RESOURCE-START<br>NZP-CSI-RS-Resource ::=    SEQUENCE {<br>   nzp-CSI-RS-ResourceId    NZP-CSI-RS-ResourceId,<br>   resourceMapping    CSI-RS-ResourceMapping,<br>   powerControlOffset    INTEGER (-8..15),<br>   powerControlOffsetSS    ENUMERATED{db-3, db0, db3, db6}<br>   OPTIONAL, -- Need R<br>   scramblingID    ScramblingId,<br>   periodicityAndOffset    CSI-ResourcePeriodicityAndOffset    OPTIONAL,<br>   -- Cond PeriodicOrSemi Persistent<br>   qcl-InfoPeriodicCSI-RS    TCI-StateId    OPTIONAL,<br>   -- Cond Periodic<br>   ...<br>}<br>-- TAG-NZP-CSI-RS-RESOURCE-STOP<br>-- ASN1STOP |

The signaling information NZP-CSI-RS-Resource includes information relating to each CSI-RS. The information included in the signaling information NZP-CSI-RS-Resource may have meanings as below.

nzp-CSI-RS-ResourceId: the index of a CSI-RS resource.
resourceMapping: resource mapping information of a CSI-RS resource.
powerControlOffset: a ratio between PDSCH EPRE (Energy Per RE) and CSI-RS EPRE.
powerControlOffsetSS: a ratio between SS/PBCH block EPRE and CSI-RS EPRE.
scramblingID: the scrambling index of a CSI-RS sequence.
periodicityAndOffset: the transmission period and the slot offset of a CSI-RS resource
qcl-InfoPeriodicCSI-RS: TCI-state information when a corresponding CSI-RS is a periodic CSI-RS.

"resourceMapping" included in the signaling NZP-CSI-RS-Resource may indicate resource mapping information of a CSI-RS resource, and the resource mapping information may include resource element (RE) mapping for frequency resources, the number of ports, symbol mapping, CDM type, frequency resource density, and frequency band mapping information. Each of the number of ports, frequency resource density, CDM type, and time-frequency domain RE mapping, which may be configured through the resource mapping information, may have a determined value in one of the rows shown in [Table 5].

A CSI-RS component RE pattern described above may be a basic unit for configuring a CSI-RS resource. A CSI-RS component RE pattern may be configured by YZ number of REs through Y=1+max(k') number of frequency domain REs and Z=1+max(l') number of time domain REs. If the number of CSI-RS ports is 1, the position of a CSI-RS RE may be designated in a PRB without restriction on subcarriers, and may be designated by a bitmap having 12 bits.

If the number of CSI-RS ports is $\{2, 4, 8, 12, 16, 24, 32\}$, and Y is equal to 2, the position of a CSI-RS RE may be designated at every two subcarriers in a PRB, and may be designated by a bitmap having 6 bits.

If the number of CSI-RS ports is 4, and Y is equal to 4, the position of a CSI-RS RE may be designated at every four subcarriers in a PRB, and may be designated by a bitmap having 3 bits.

Similarly, the position of a time domain RE may be designated by a bitmap having a total of 14 bits.

According to a Z value shown in [Table 5], the length of a bitmap can be changed like a frequency position designation. However, the principle of the change is similar to the description above, and therefore, a duplicate description will be omitted hereinafter.

Unlike the conventional system, an NR system can support all services including a service having very short transmission latency and a service requiring high connection density, as well as a service requiring high data rate. In a wireless communication network including multiple cells,

TABLE 5

| Row | Ports X | Density $\rho$ | cdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l0), (k_0, l0 + 1), (k_1, l_0 + 1), (k_0, l_1), (k_1, l_1), (k_2, l_1), (k_0, l_1 + 1), (k_1, l_1 + 1), (k$ | 0, 1, 2, 3, 4, 5 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0),$ | 0, 1, 2 | 0, 1 | 0, 1, 2, 3 |
| 16 | 32 | 1, 0.5 | FD-CDM2 | $(k_0, l_0), (k_1, l_0), (k_2, l), (k_3, l_0),$ $(k_0, l_0 + 1), (k_1, l_0 +1), (k_2, l_0 + 1), (k_3, l_0 + 1),$ $(k_0, l_1), (k_1, l_1), (k_2, l_1), (k_3, l_1),$ $(k_0, l_1 + 1), (k_1, l_1 + 1), (k_2, l_1 + 1), (k_3, l_1 + 1),$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1),$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

[Table 5] shows a frequency resource density configurable according to the number (X) of CSI-RS ports, a CDM type, frequency and time domain starting positions $(\bar{k}, \bar{l})$ of a CSI-RS component RE pattern, and the number (k') of frequency domain REs and the number (l') of time domain REs of a CSI-RS component RE pattern.

transmission and reception points (TRPs), or beams, coordinated transmission between cells, TRPs, and/or beams is one of the elementary technologies for increasing the intensity of a signal received by a terminal, or efficiently performing interference control between cells, TRPs, and/or beams, to satisfy the various service requirements.

Joint transmission (JT) is a representative transmission technology for coordinated transmission described above, and through the technology, one terminal is supported through different cells, TRPs, and/or beams to increase the intensity of a signal received by the terminal. The characteristics of channels between a terminal and each cell, TRP, and/or beam may be largely different from each other. Therefore, different precoding, MCS, and resource allocation are required to be applied to links between a terminal and each cell, TRP, and/or beam. Especially, in a case of a non-coherent joint transmission (NC-JT) supporting non-coherent precoding between cells, TRPs, and/or beams, individual downlink transmission information configurations for the cells, TRPs, and/or beams are important.

Figure 9:
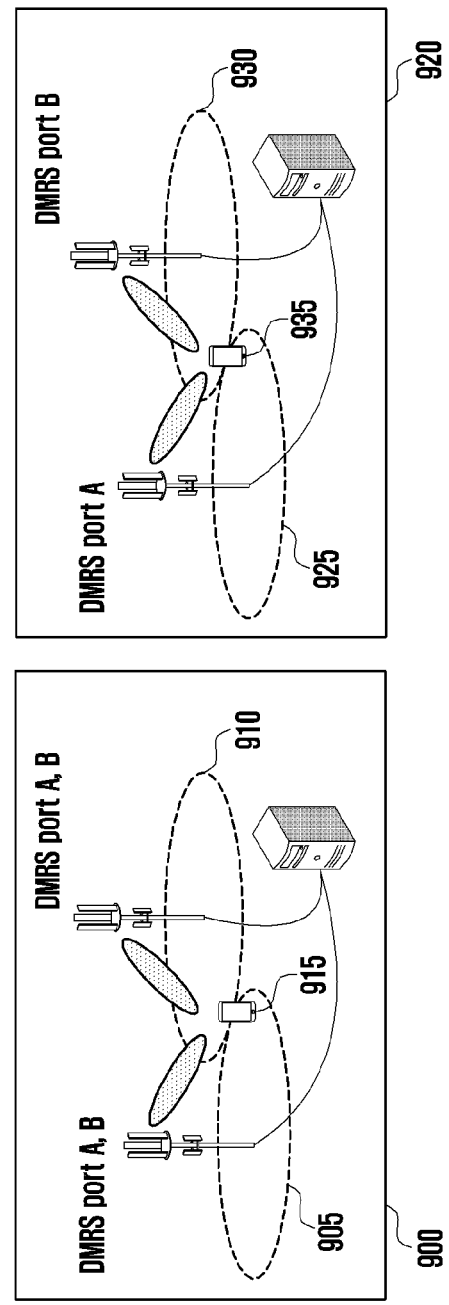
FIG. 9 illustrates a diagram of examples of wireless resource allocation for each TRP according to joint transmission (JT) techniques and situations of the disclosure.

FIG. 9 illustrates a diagram of examples of wireless resource allocation for each TRP according to joint transmission (JT) techniques and situations of the disclosure.

In FIG. 9, a part 900 is a diagram illustrating coherent joint transmission (C-JT) supporting coherent precoding between cells, TRPs, and/or beams.

In C-JT, TRPA 905 and TRPB 910 transmit identical data (PDSCH), and joint precoding is performed in multiple TRPs. This means that TRP A 905 and TRP B 910 transmit the same DMRS ports (e.g. DMRS ports A and B from each of the two TRPs) for transmission of an identical PDSCH. A terminal may receive one piece of DCI information for receiving one PDSCH demodulated based on a DMRS transmitted through DMRS ports A and B.

In FIG. 9, a part 920 is a diagram illustrating non-coherent joint transmission (NC-JT) supporting non-coherent precoding between cells, TRPs, and/or beams.

In NC-JT, different PDSCHs are transmitted from the cells, TRPs, and/or beams, and individual precoding may be applied to each PDSCH. This means that TRP A 925 and TRP B 930 transmit different DMRS ports (e.g. DMRS port A from TRP A, and DMRS port B from TRP B) for transmission of different PDSCHs. A terminal may receive two types of DCI information for receiving PDSCH A demodulated based on a DMRS transmitted through DMRS port A, and PDSCH B demodulated based on a DMRS transmitted through DMRS port B.

In embodiments, "a case of NC-JT" or "a case in which NC-JT is applied" can be variously interpreted in accordance with a situation, to be "a case where a terminal receives one or more PDSCHs simultaneously in one BWP", "a case where a terminal receives a PDSCH, based on two or more TCI indications simultaneously, in one BWP", and "a case where a PDSCH received by a terminal is associated with one or more demodulation reference signal (DM-RS) port groups". However, for convenience of explanation, the expressions described above are used.

In embodiments, a terminal in a coordinated communication environment may receive information by multiple TRPs having various channel qualities, and a TRP among the TRPs, which has the best channel quality and thus provides pieces of main control information, is named a main TRP, and the remaining TRPs are named coordinated TRPs.

In embodiments, a "TRP" can be replaced with various terms, such as, a "panel" or a "beam" in practical application.

A terminal is required to normally receive a PDCCH transmitted by a base station, so as to enable smooth downlink transmission between the base station and the terminal. If the terminal is unable to normally receive a PDCCH, this may imply that beam failure has occurred between the terminal and the base station. A criterion and a method for determining whether a terminal is able to normally receive a PDCCH will be described later. An NR system supports a beam failure recovery (BFR) procedure for coping with dynamic beam failure between a base station and a terminal so as to enable smooth downlink transmission.

A BFR procedure in an NR system may be divided into four main processes. The first process is a process of detecting beam failure. Hereinafter, the first process may be called a beam failure detection (BFD) process, and a detailed description will be given below. In the BFD process, a terminal determines whether to receive a PDCCH normally, and if the terminal is determined to be unable to normally receive a PDCCH, the terminal reports beam failure to a higher layer through signaling. The higher layer of the terminal may detect beam failure by the reporting, and may determine whether to perform the next process of BFR.

A criterion of determining whether a terminal can normally receive a PDCCH corresponds to a hypothetical PDCCH reception block error rate (BLER) of the terminal, and the terminal may determine the same by comparing the block error rate with a predetermined threshold. The terminal requires a reference signal (RS) set for BFD to calculate the hypothetical PDCCH reception BLER, and hereinafter, the RS set will be referenced as a BFD RS set.

A BFD RS set may include a maximum of two RSs, and each of the RSs may be a periodic CSI-RS transmitted through a single port, or a synchronization/broadcast channel block (SSB). A BFD RS set may be configured through higher layer signaling of the base station. If the BFD RS set is not configured through higher layer signaling, the BFD RS set may include a part or all of RSs referenced in an activated TCI state of a CORESET(s) configured for PDCCH monitoring of the terminal. If there are two or more RSs referenced in a TCI state, the BFD RS set may include an RS referenced for "QCL-typeD" including beam information. A terminal may calculate a hypothetical PDCCH reception BLER, based on only an RS referenced in an activated TCI state of a CORESET(s) configured for PDCCH monitoring, among the RSs included in a BFD RS set. The terminal may calculate the hypothetical PDCCH reception BLER by referring to [Table 6] below.

TABLE 6

| Attribute | Value for BLER |
| --- | --- |
| DCI format | 1-0 |
| Number of control OFDM symbols | Same as the number of symbols of CORESET QCLed with respective CSI-RS for BFD |
| Aggregation level (CCE) | 8 |
| Ratio of hypothetical PDCCH RE energy to average CSI-RS RE energy | 0 dB |
| Ratio of hypothetical PDCCH DMRS energy to average CSI-RS RE energy | 0 dB |
| Bandwidth (MHz) | Same as the number of PRBs of CORESET QCLed with respective CSI-RS for BFD |
| Sub-carrier spacing (kHz) | Same as the SCS of CORESET QCLed with respective CSI-RS for BFD |
| DMRS precoder granularity | REG bundle size |
| REG bundle size | 6 |
| CP length | Same as the CP length of CORESET QCLed with respective CSI-RS for BFD |
| Mapping from REG to CCE | Distributed |

[Table 6] provides a configuration relating to a hypothetical PDCCH referenced by a terminal when the terminal calculates a hypothetical PDCCH reception BLER. Referring to [Table 6], the terminal may calculate a hypothetical PDCCH reception BLER under an assumption of the number of OFDM symbols of a CORESET(s) having an activated TCI state referring to an RS included in a BFD RS set, a bandwidth, subcarrier spacing, and a CP length.

The terminal may calculate a radio link quality of each of all CORESETs each having an activated TCI state referring to an RS included in a BFD RS set. If the radio link quality of a CORESET is lower than a configured threshold, a lower layer of the terminal (e.g. a physical layer) may report (indicate) the result to the higher layer of the terminal. For example, the terminal calculates the hypothetical PDCCH reception BLER of CORESETs, and if the hypothetical PDCCH reception BLER of each of all CORESETs is equal to or larger than a configured threshold, the terminal reports beam failure to the higher layer through signaling.

If the higher layer of the terminal detects beam failure by the reporting, the higher layer may determine whether to perform the next process of BFR, and may refer to the parameters below configured for a higher layer operation process. The parameters below may be received from the base station through higher layer signaling.

beamFailureInstanceMaxCount: the number of times of beam failure reporting of a terminal, required for performing the next process of BFR.

beamFailureDetectionTimer: a timer configuration for initializing the number of times of beam failure reporting of a terminal.

The second process in the BFR procedure of the NR system is a process for searching for a new beam having a good channel state, and hereinafter, the second process may be called a new candidate beam identification process. If the higher layer of the terminal detects beam failure and determines to proceed with a process for searching for a new beam, the higher layer may request the lower layer (e.g. a physical layer) of the terminal to report information relating to a new candidate beam, for example, L1-reference signal received power (RSRP).

The base station may configure a candidate beam RS set through higher layer signaling so as to allow the terminal to calculate information relating to a new candidate beam. The candidate beam RS set may include a maximum of 16 RSs, and each of the RSs may be a periodic CSI-RS or an SSB. If the higher layer of the terminal requests the lower layer of the terminal to report information relating to a new candidate beam, the lower layer of the terminal reports index information and L1-RSRP measured values of RSs each having an L1-RSRP value larger than an RSRP threshold configured through higher layer signaling, among the RSs included in a candidate beam RS set. The higher layer of the terminal may obtain information relating to new beams having a good channel state through reporting.

If the higher layer of the terminal obtains information relating to new beams having a good channel state, the higher layer selects one of the new beams and notifies the physical layer of the selected one, and the terminal transmits a request signal for BFR to the base station. The process described above corresponds to the third process of the BFR procedure, and hereinafter, the third process will be described as a BFR request process. The higher layer of the terminal selects, in a candidate beam RS set, a new RS to be referenced by the terminal for a BFR request based on information relating a new beam, and notifies the physical layer of the signaled terminal of the selected new RS. The terminal may obtain configuration information relating to transmission of a physical random access channel (PRACH) through which a BFR request is to be transmitted, through new RS information for the BFR request and BFR request resource information configured through higher layer signaling. For example, the base station and the terminal may exchange signaling information described as below to transfer configuration information relating to PRACH transmission through which a BFR request is to be transmitted.

| BeamFailureRecoveryConfig information element |
|---|

```
--ASN1START
--TAG-BEAMFAILURERECOVERYCONFIG-START
BeamFailureRecoveryConfig ::=      SEQUENCE {
rootSequenceIndex-BFR              INTEGER (0..137)
OPTIONAL, -- Need M
rach-ConfigBFR                     RACH-ConfigGeneric
OPTIONAL, -- Need M
rsrp-ThresholdSSB                  RSRP-Range
OPTIONAL, -- Need M
candidateBeamRSList                SEQUENCE (SIZE(1..maxNrofCandidateBeams)) OF PRACH-
ResourceDedicatedBFR     OPTIONAL, -- Need M
ssb-perRACH-Occasion               ENUMERATED {oneEighth, oneFourth, oneHalf, one, two,
                                               four, eight, sixteen}
OPTIONAL, -- Need M
ra-ssb-OccasionMaskIndex           INTEGER (0..15)
OPTIONAL, -- Need M
recoverySearchSpaceId              SearchSpaceId
OPTIONAL, -- Need R
ra-Prioritization                  RA-Prioritization
OPTIONAL, -- Need R
beamFailureRecoveryTimer           ENUMERATED {ms10, ms20, ms40, ms60, ms80, ms100, ms150,
ms200}     OPTIONAL, -- Need M
...,
[[
msg1-SubcarrierSpacing-v1530       SubcarrierSpacing
OPTIONAL -- Need M
]]
}
PRACH-ResourceDedicatedBFR ::=     CHOICE {
ssb                                BFR-SSB-Resource,
```

| BeamFailureRecoveryConfig information element |
| --- |
| csi-RS                         BFR-CSIRS-Resource |
| } |
| BFR-SSB-Resource ::=           SEQUENCE { |
| ssb                              SSB-Index, |
| ra-PreambleIndex                 INTEGER (0..63), |
| ... |
| } |
| BFR-CSIRS-Resource ::=         SEQUENCE { |
| csi-RS                           NZP-CSI-RS-ResourceId, |
| ra-OccasionList                  SEQUENCE (SIZE(1..maxRA-OccasionsPerCSIRS)) OF INTEGER |
| (0..maxRA-Occasions-1)      OPTIONAL, -- Need R |
| ra-PreambleIndex                 INTEGER (0..63) |
| OPTIONAL, -- Need R |
| ... |
| } |
| -- TAG-BEAMFAILURERECOVERYCONFIGS-STOP |
| -- ASN1STOP |

The BeamFailureRecoveryConfig includes information relating to PRACH transmission through which a BFR request is to be transmitted. Information included in BeamFailureRecoveryConfig is as below.

rootSequenceIndex-BFR: the root sequence index of a sequence used for PRACH transmission.

rach-ConfigBFR: this includes a PRACH configuration index, the number of frequency resources, a frequency resource starting point, a response monitoring window, and a parameter for adjustment of the strength of PRACH transmission, among parameters for PRACH transmission.

rsrp-ThresholdSSB: an RSRP threshold allowing a new beam to be selected among the RSs included in a candidate beam RS set.

candidateBeamRSList: a candidate beam RS set.

ssb-perRACH-Occasion: the number of SSBs connected to a random access channel (RACH) transmission occasion.

ra-ssb-OccasionMaskIndex: a PRACH mask index for random access resource selection of a terminal.

recoverySearchSpaceId: a search space index for receiving a PDCCH used for transmission of a random access response (RAR) signal by a base station in response to a BFR request.

ra-Prioritization: a parameter set used in a random access process having priority.

beamFailureRecoveryTimer: a timer for initializing a configuration relating to a PRACH resource on which a BFR request is to be transmitted.

msg1-SubcarrierSpacing-v1530: subcarrier spacing for PRACH transmission through which a BFR request is to be transmitted.

The terminal transmits a BFR request signal to the base station by referring to configuration information for relating to PRACH transmission through which a BFR request is to be transmitted.

The fourth process of the BFR procedure in the NR system is a process in which the base station having received a BFR request signal of the terminal transmits a response signal to the terminal. Hereinafter, the fourth process may be called a gNB response process. The signaling BeamFailureRecoveryConfig among configuration parameters for BFR includes a search space index for receiving a PDCCH used for transmitting a random access response signal by the base station in response to a BFR request. The base station transmits a PDCCH by using resources in a search space configured for response. If the terminal receives a PDCCH through a search space for receiving the PDCCH, the terminal determines that the BFR procedure is complete. If the terminal receives a PDCCH through a search space for receiving the PDCCH, the base station may indicate, to the terminal, a new beam configuration for PDCCH or PUCCH transmission.

The disclosure provides a method and a process for indicating a BFD RS set through configuration information by a base station, or selecting a BFD RS set by a terminal in a BFD process of a BFR procedure of an NR system. In accordance with an NR system protocol, a BFD RS set may include a maximum of two RSs, and may be configured through higher layer signaling. If the BFD RS set is not configured through higher layer signaling, the BFD RS set may include a part or all of RSs referenced in an activated TCI state of a CORESET(s) configured for PDCCH monitoring of a terminal.

While a BFD RS set may include a maximum of two RSs, three or more CORESETs may be configured for PDCCH monitoring of a terminal. Therefore, if a BFD RS set is not configured through higher layer signaling, a method of selecting a part of RSs referenced in an activated TCI state of a CORESET(s) configured for PDCCH monitoring of the terminal is indicated to the terminal. Therefore, the efficiency of a BFD process of determining whether smooth downlink transmission is possible between a base station and the terminal is increased, so that the BFR procedure can be performed with low latency time. Alternatively, a suitable RS is indicated to be included in a BFD RS set, so that a BFD process of effectively determining beam failure between the base station and the terminal can be performed.

According to an NR system described above, a BFD RS set is configured through higher layer signaling. If the BFD RS set is not configured through higher layer signaling, the BFD RS set may include a part or all of RSs referenced in an activated TCI state of a CORESET(s) configured for PDCCH monitoring of the terminal.

The terminal may detect beam failure, based on only an RS referenced in an activated TCI state of a CORESET(s) configured for PDCCH monitoring, among the RSs included in the BFD RS set. As described above, in a case where a BFD RS set is configured through higher layer signaling, if there is an RS not corresponding to an RS referenced in an activated TCI state of a CORESET(s) configured for PDCCH monitoring of the terminal, among the RSs included in the BFD RS set configured through higher layer signaling, the terminal does not use the RS to detect beam failure. Therefore, if there occurs a mismatch between an RS referenced in an activated TCI state of a CORESET(s) configured for PDCCH monitoring of a terminal, and a BFD RS set configured through higher layer signaling, it is hard to expect stable detection of beam failure by the terminal, and this leads to deterioration of downlink reception performance.

For example, a base station may configure a BFD RS set through RRC signaling for a terminal, but the base station activates a TCI state of a CORESET through MAC CE signaling. Therefore, a mismatch between the BFD RS set and an RS of the TCI state may occur due to the difference between latency times according to the signaling methods.

Therefore, it is possible that a base station does not directly configure a BFD RS set through higher layer signaling, so as to resolve a mismatch between a BFD RS set configured through RRC signaling, and an RS referenced in a TCI state of a CORESET, activated through MAC CE signaling. If a BFD RS set is not directly configured through higher layer signaling, the terminal may randomly include, in the BFD RS set, a part or all of RSs referenced in an activated TCI state of a CORESET(s) configured for PDCCH monitoring of the terminal. In this case, the base station is unable to obtain information relating to a BFD RS set determined by the terminal, and thus has low understanding of a BFR request signal of the terminal.

In order to solve the problem described above, a method of selecting a part of RSs referenced in an activated TCI state of a CORESET(s) configured for PDCCH monitoring of the terminal is indicated to the terminal. Therefore, the base station may recognize information relating to a BFD RS set selected by the terminal. Through the solution, the base station can have an enhanced understanding of a BFR request signal of the terminal. Alternatively, the efficiency of a BFD process of determining whether smooth downlink transmission is possible between a base station and the terminal is increased, so that the BFR procedure can be performed with low latency time. Alternatively, a suitable RS is indicated to be included in a BFD RS set, so that a BFD process of effectively determining beam failure between the base station and the terminal can be performed.

The disclosure provides a method and a process for, if a base station does not directly configure a BFD RS set through higher layer signaling, indicating a method of configuring a BFD RS set, through configuration information by the base station, or selecting a BFD RS set by a terminal. However, the disclosure is not limited thereto.

For example, if a base station directly configures a BFD RS set through higher layer signaling like in the conventional manner, it may be interpreted that a method and a process for configuring a BFD RS set by the base station are provided. In this case, the base station enables direct configuration of a BFD RS set through MAC CE signaling, so that a mismatch between the BFD RS set and an RS referenced in a TCI state of a CORESET can be resolved.

Hereinafter, in an embodiment, for convenience of description, a method and a process for, if a base station does not directly configure a BFD RS set through higher layer signaling, indicating, by the base station and to a terminal, a method of configuring a BFD RS set, through configuration information, or selecting a BFD RS set by the terminal will be mainly described. However, the embodiment can be applied, in the same way, to a method for, if a base station directly configures a BFD RS set through higher layer signaling, forming the BFD RS set by the base station.

In addition, the disclosure provides a method and a process for indicating, by the base station, a BFD RS set through configuration information, or selecting a BFD RS set by the terminal. However, the disclosure is not limited thereto. For example, with respect to a partial BFD method for determining a BFD RS set in the conventional manner, selecting a part of the RSs in the BFD RS set, and performing BFD, it may be interpreted that the disclosure provides a method and a process for selecting an RS(s) performing BFD. Hereinafter, in an embodiment, for convenience of description, a method and a process for indicating a BFD RS set through configuration information by a base station and selecting a BFD RS set by a terminal will be mainly described. However, the embodiment can be applied, in the same way, to a method for selecting an RS(s) performing BFD in a BFD RS set in the partial BFD method.

Hereinafter, an embodiment will be described in detail with reference to the accompanying drawings. In the following description of the disclosure a detailed description of related functions or configurations incorporated herein will be omitted when it may make the subject matter of the disclosure rather unclear. The terms as described below are defined in consideration of the functions in the disclosure, and the meaning of the terms may vary according to the intention of a user or operator, convention, or the like. Therefore, the definitions of the terms should be made based on the contents throughout the specification.

Hereinafter, in the disclosure, the examples described above will be explained through multiple embodiments. However, the embodiments are not independent, and one or more embodiments can be applied simultaneously or in combination.

First Embodiment: Method for Providing BFD RS Set Configuring Method Through Higher Layer Signaling In order to resolve a mismatch between a BFD RS set configured through RRC signaling, and an RS referenced in a TCI state of a CORESET, activated through MAC CE signaling, a base station may transfer, to a terminal, information or an indication relating to a method of configuring an BFD RS set, through higher layer signaling (e.g. RRC signaling or MAC CE signaling). Hereinafter, information relating to a configuring a BFD RS set may be used together with BFD RS set configuration information, BFD RS configuration information, RS set configuration information, and RS configuration information.

The base station does not directly configure a BFD RS set through RRC signaling, and configures information relating to a method for configuring a BFD RS set, through RRC signaling or MAC CE signaling, so that if an activated TCI state of a CORESET is changed through MAC CE signaling, a BFD RS set may be simultaneously changed according to the change of the activated TCI state of the CORE SET. Therefore, a flexible operation of a BFD RS set is possible, and a mismatch between a BFD RS set and an RS referenced in an activated TCI state of a CORESET does not occur, so that stable beam failure detection of the terminal can be expected.

For example, information (information for configuring a BFD RS set, or BFD RS configuration information) relating to an RS for beam failure detection or radio link monitoring (RLM), the information being configured for the terminal by the base station, may include at least one of the pieces of information below.

- the size of a BFD RS set
- an indication (this may include at least one of the pieces of information below) relating to determination on the priority of an RS
- an indication relating to a rule to be followed among rules determining the priority of an RS
- information relating to a rule determining the priority of an RS
- a priority according to a QCL type supported by an RS
- a priority according to time domain transmission information of an RS
- a priority of a CSI-RS or an SSB
- an indication (this may include at least one of the pieces of information below) relating to an RS group
- whether to consider the index of an RS group
- whether to make a particular group (e.g. an RS group connected to a main CORESET group) a priority
- the index of an RS group having high priority
- whether to include at least one RS in each RS group
- whether to configure a BFD RS set for each RS group "An indication relating to determination on the priority of an RS" which may be included in the information for configuring a BFD RS set is information for determining a priority allowing an RS to be included in the BFD RS set among RSs referenced in an activated TCI state of a CORESET configured for PDCCH monitoring of the terminal.

A method for configuring a BFD RS set by using RSs referenced in an activated TCI state of a CORESET, based on indication information relating to determination on the priority of an RS, will be described in the second embodiment.

"An indication relating to an RS group" which may be included in the information for configuring a BFD RS set provides indication information relating to a method by which information relating to an RS group is used to configure a BFD RS set, if grouping information relating to RSs referenced in an activated TCI state of a CORESET configured for PDCCH monitoring of the terminal is provided.

A method for configuring a BFD RS set by using RSs referenced in an activated TCI state of a CORESET, based on indication information relating to an RS group, will be described in the third embodiment.

The terminal may include, in a BFD RS set, a part or all RSs referenced in an activated TCI state of a CORESET by referring to configuration information relating to a method for configuring the BFD RS set, as described above.

Figure 10:
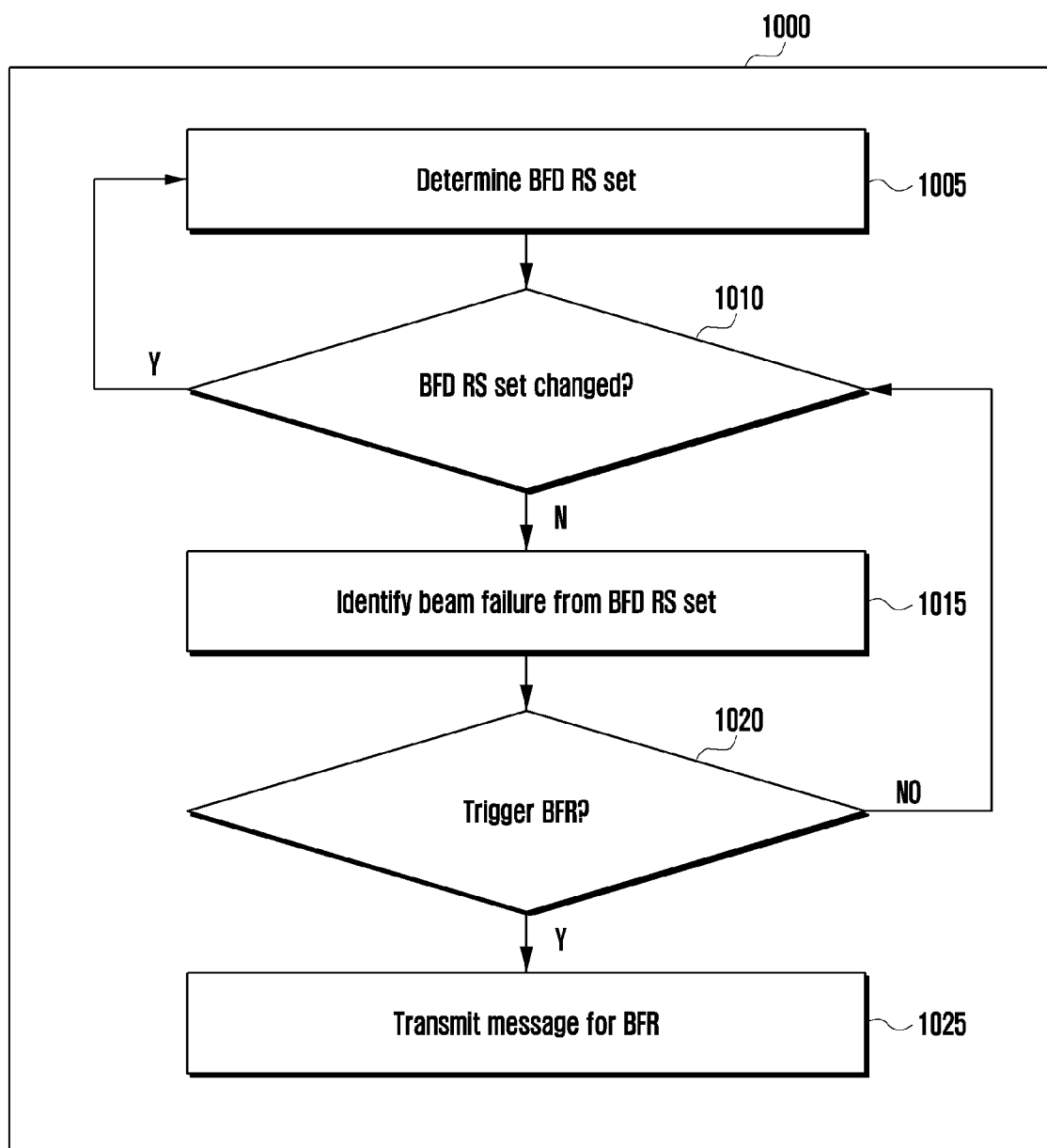
FIG. 10 illustrates a diagram of an example of a flowchart of an operation process of a terminal when a base station provides information relating to a method for configuring a BFD RS set, through higher layer signaling according to embodiments.

FIG. 10 illustrates a diagram of an example of a flowchart of an operation process of a terminal when a base station provides information relating to a method for configuring a BFD RS set, through higher layer signaling according to embodiments.

Referring to FIG. 10, when information relating to a method for configuring a BFD RS set is received through higher layer signaling from a base station, a BFD process may be performed according to a flowchart 1000.

A terminal may determine a BFD RS set according to a method for configuring the BFD RS set, the method being configured through higher layer signaling (operation 1005). The method for configuring the BFD RS set may be determined based on the descriptions given in the first embodiment to the third embodiment. A combination of one or more embodiments among the first embodiment to the third embodiment may be applied as the method for configuring the BFD RS set, or a part of the method of the disclosure may be applied.

For example, if information relating to the priority of an RS is included in configuration information for configuring a BFD RS set, transmitted through RRC signaling or MAC CE signaling according to the first embodiment, the terminal may configure the BFD RS set, based on the description given in the second embodiment.

In addition, if information relating to an RS group is included in configuration information for configuring a BFD RS set, transmitted through RRC signaling or MAC CE signaling according to the first embodiment, the terminal may configure the BFD RS set, based on the description given in the third embodiment.

In addition, if information relating to a priority and an RS group is included in configuration information for configuring a BFD RS set, transmitted through RRC signaling or MAC CE signaling according to the first embodiment, the terminal may configure the BFD RS set, based on a description given in the second and third embodiments.

The BFD RS set configuration information may be included in CORESET configuration information, or may be transmitted as separate information through RRC signaling or a MAC CE.

The terminal may check whether the BFD RS set is changed (operation 1010). For example, the terminal may determine whether there is MAC CE signaling which allows activating a TCI state of a CORESET configured for PDCCH monitoring, or changing an activated TCI state (operation 1010).

Alternatively, the terminal may receive, from the base station, an indication for a change of the BFD RS set. For example, the base station may change and transmit configuration information for configuring a BFD RS set through RRC signaling or MAC CE signaling, and the terminal may understand the changed configuration information as an indication for a change of the BFD RS set. As another example, the base station may change and transmit configuration information relating to a CORESET through RRC signaling, and an activated TCI state of the CORESET may be changed accordingly. The terminal may understand the changed TCI state as an indication for a change of the BFD RS set. However, operation 1010 may be omitted.

If the BFD RS set is changed, the terminal may determine a new BFD RS set in operation 1005. For example, if MAC CE signaling has existed, the terminal may newly determine a BFD RS set by referring to an activated TCI state of a changed CORESET.

If the BFD RS set is not changed (e.g. MAC CE signaling does not exist), the terminal may determine whether there is beam failure with respect to the determined BFD RS set (operation 1015).

In addition, the terminal may determine whether to trigger BFR, based on a result of the determination on beam failure (operation 1020). If a BFR is triggered, the terminal may transmit a message or signal (e.g. a random access preamble) for the BFR to the base station (operation 1025).

Specifically, the operations of determining whether there is beam failure of the terminal and determining whether to trigger BFR may include an operation in which a lower layer of the terminal performs beam failure indication reporting for a higher layer of the terminal according to a configured beam failure indication reporting configuration. The beam failure indication reporting configuration configured for a lower layer operation of the terminal may include a beam failure indication reporting period. Therefore, the higher layer of the terminal may determine whether to trigger BFR by considering a parameter for a higher layer operation, including the contents of beam failure indication reporting, the number of times of beam failure indication reporting of the terminal, the number being required for performing BFR, and a timer configuration for initializing the number of times of beam failure indication reporting of the terminal. In the disclosure, the higher layer of the terminal may be expressed as a first layer, and the lower layer may be expressed as a second layer.

If the terminal determines to trigger a BFR, the terminal may trigger the BFR (operation 1025). If the terminal determines not to trigger a BFR, the terminal may return to operation 1010 and determine whether the BFD RS set is changed, for example, whether there is new MAC CE signaling which allows activating a TCI state of a CORESET configured for PDCCH monitoring, or changing an activated TCI state (operation 1010).

In another example of a method for configuring a BFD RS set, the base station may provide, to the terminal and through higher layer signaling, information (e.g. information relating to an RS group, a CORESET, or an RS) relating to an RS excluded so as not to be included in a BFD RS set. Therefore, the terminal may exclude RSs according to information (e.g. information relating to an RS group, a CORESET, or an RS) relating to the RSs which are configured not to be included in a BFD RS set, and may randomly determine whether to include another RS candidate in the BFD RS set.

Alternatively, the terminal may exclude RSs according to information (e.g. information relating to an RS group, a CORESET, or an RS) relating to the RSs which are configured not to be included in a BFD RS set, and may determine the BFD RS set with respect to another candidate according to the BFD RS configuration information described above. The BFD RS configuration information may include the priority of a CORESET or an RS according to the second embodiment as described above, and accordingly, a BFD RS set may be determined.

For example, the base station may indicate an RS included in a particular RS group such that the RS is not included in a BFD RS set. If a particular RS group is configured by RSs referenced in an activated TCI state of a CORESET for a PDCCH transmitted by a particular TRP, the base station indicates the RSs included in the particular RS group such that the RSs are not included in a BFD RS set. Therefore, beam failure detection excluding whether there is beam failure with the particular TRP, and ensuring downlink reception performance with other TRPs can be expected.

As another example, the base station may indicate the terminal to include a periodic CSI-RS in a BFD RS set rather than a semi-persistent CSI-RS or aperiodic CSI-RS. Therefore, stable and continuous beam failure detection of the terminal through a periodic CSI-RS or an SSB can be expected.

As another example, the base station may indicate the terminal not to include an SSB in a BFD RS set. Therefore, beam failure detection based on fine beamforming information provided by a CSI-RS can be expected.

As another example, the base station may indicate the terminal not to include an RS that does not support "QCL-typeD", in a BFD RS set. Therefore, efficient beam failure detection through only an RS supporting "QCL-typeD" including beam information can be expected.

The above operation may be possible when the size of a BFD RS set is limited, and the number of RSs which can be included in a BFD RS set according to information relating to a CORE SET group, a CORESET, or an RS excluded so as not to be included in the BFD RS set, the information being provided by the base station, is larger than that of RSs which can be included in the BFD RS set.

Second Embodiment: Method for Determining BFD RS Set According to Priority of CORESET or RS In case that a BFD process is to be performed by configuring a BFD RS set having RSs, the number of which is smaller than the number of CORESETs configured for PDCCH monitoring of a terminal, the terminal is able to determine a BFD RS set according to configuration information through higher layer signaling, the priority of a CORESET according to a predetermined rule, or an RS referenced in an activated TCI state of a CORESET.

For example, if a base station and the terminal are to perform signal transmission and reception according to an NR communication system in an unlicensed band, the base station and the terminal may configure four or more CORESETs in one BWP configuration to perform a listen before talk (LBT) operation for smooth downlink transmission in a carrier bandwidth. If an LBT bandwidth for performing the LBT operation is smaller than the carrier bandwidth, a CORESET may be configured such that the frequency resources of the CORESET are included in the LBT bandwidth, so as to support a PDCCH transmitted within the LBT bandwidth. The number of CORESETs included in one BWP configuration may be changed according to the size relationship between an LBT bandwidth and a carrier bandwidth. A BFD RS set is configured by RSs, the number of which is smaller than the number of CORESETs, or the size of a BFD RS set is limited to be a particular value, so that a beam failure determination criterion of the terminal is not changed according to the number of CORESETs. Therefore, the reliability of a BFD process and beam failure indication reporting of the terminal can be improved, and an overload applied to a performance due to beam failure detection of the terminal can be lowered.

As another example, in a case of NC-JT through multiple TRPs, the base station and the terminal may configure CORESETs, the number of which is larger than that of CORESETs for a single TRP, so as to support PDCCH monitoring of the terminal for a PDCCH transmitted by a plurality of TRPs. In a case of NC-JT through multiple TRPs, if CORESETs configured for the terminal are grouped as in the third embodiment described later and thus a group index is configured for each of the CORESETs, the terminal may be configured to receive PDCCHs transmitted by a single TRP through CORESETs belonging to the same group, and the terminal may recognize that PDCCHs transmitted by different TRPs can be received through CORESETs belonging to different groups. Alternatively, even in a case of NC-JT through multiple TRPs, unlike the third embodiment, CORESETs may be not grouped. Therefore, the terminal may perform PDCCH monitoring for configured CORESETs without discriminating between TRPs. In this case, a BFD RS set is configured by RSs, the number of which is smaller than the number of CORESETs, or the size of a BFD RS set is limited to be a particular value, so that a beam failure determination criterion of the terminal is not changed according to the number of CORESETs. Therefore, the reliability of a BFD process and beam failure indication reporting of the terminal can be improved, and an overload applied to a performance of the terminal due to beam failure detection of the terminal can be lowered.

As described above, if a BFD process is to be performed by configuring a BFD RS set having RSs, the number of which is smaller than the number of CORESETs configured for PDCCH monitoring of the terminal, the base station may configure, for the terminal and through higher layer signaling, a method for configuring a BFD RS set, or the terminal may determine a method for configuring a BFD RS set, according to a predetermined rule. A method for configuring a BFD RS set by the terminal, which is transmitted through higher layer signaling by the base station, or is configured according to a predetermined rule, may include a method for determining a BFD RS set according to the priority of a CORESET or an RS referenced in an activated TCI state of a CORESET. Therefore, the present embodiment provides a method for determining a BFD RS set according to an RS priority by the terminal.

A BFD RS set is configured according to the priority of a CORESET or an RS referenced in an activated TCI state of a CORESET, so that the quality of beam failure indication reporting of the terminal can be enhanced. Further, the base station and the terminal recognizes the priority of a CORESET or an RS referenced in an activated TCI state of a CORESET, so that the base station can have an improved understanding of a BFR request of the terminal.

The terminal may receive BFD RS set configuration information including information relating to the priority of an RS from the base station. Alternatively, the information relating to the priority of an RS may be previously determined. The information relating to the priority of an RS may be variously configured, and an example of the information will be described below.

The priority of a CORESET used to configure a BFD RS set by the terminal may be determined in consideration of a part or all of the index of the CORESET, or whether the CORESET is configured in an initial access process. For example, the terminal may consider, to be a low level, the priority of an RS referenced in an activated TCI state of CORESET #0 configured in an initial access process, and may preferentially include, in a BFD RS set, an RS referenced in an activated TCI state of a CORESET different from CORESET #0. Therefore, the terminal can implement an SSB excluded from a BFD RS set, by considering, to be low, the priority of the SSB, the SSB being referenced in a TCI state which may be configured to be activated in CORESET #0.

As another example, the terminal may preferentially consider and include, in a BFD RS set, an RS referenced in an activated TCI state of a CORESET having a low CORESET index.

The priority of an RS referenced in an activated TCI state of a CORESET used to configure a BFD RS set by the terminal may be determined by considering a part or all of the type of the RS referenced in the activated TCI state of the CORESET, the QCL type of the RS, or lime domain transmission information of the RS (or time resource information).

For example, the terminal is able to consider the priority of a periodic CSI-RS among RSs referenced in an activated TCI state of a CORESET, to be higher than those of the other CSI-RSs, and preferentially include a periodic CSI-RS in a BFD RS set. Therefore, the terminal determines whether there is beam failure with respect to a periodic CSI-RS that is periodically transmitted, so that the terminal can precisely and reliably determine whether there is beam failure, compared to a case of determining whether there is beam failure with respect to a CSI-RS that is semi-persistently or aperiodically transmitted.

As another example, the terminal is able to consider the priority of a CSI-RS among RSs referenced in an activated TCI state of a CORESET, to be higher than that of an SSB, and preferentially include a CSI-RS in a BFD RS set.

As another example, the terminal is able to consider, to be high, the priority of an RS supporting "QCL-typeD" including beam information among RSs referenced in an activated TCI state of a CORESET, and preferentially include an RS described above in a BFD RS set.

The terminal may configure a BFD RS set by considering both the priority of a CORESET used to configure the BFD RS set, and the priority of an RS referenced in an activated TCI state of the CORESET.

For example, the terminal may consider, by referring to [Table 7] below, that the priorities of RSs get higher in the descending order, and may preferentially include an RS having a high priority in a BFD RS set. The order of RSs shown in [Table 7] below merely corresponds to an example of the disclosure, and the order (i.e. the priorities) of the RSs may be changed.

TABLE 7

The priority of an RS referenced in an activated TCI state of a CORESET

A periodic CSI-RS supporting "QCL-typeD"
An SSB supporting "QCL-typeD"
A semi-persistent CSI-RS or aperiodic CSI-RS supporting "QCL-typeD"
A periodic CSI-RS not supporting "QCL-typeD"
An SSB not supporting "QCL-typeD"
A semi-persistent CSI-RS or aperiodic CSI-RS not supporting "QCL-typeD"

In addition, referring to [Table 7], if RSs referenced in activated TCI states of CORESETs have the same priority, the terminal may determine that the priority of an RS referenced in an activated TCI state of a CORESET having a low index is high.

The priority of an RS referenced in an activated TCI state of a CORESET, provided in [Table 7], merely corresponds to one of embodiments, and the disclosure is not limited thereto. In other words, the priority of an RS referenced in an activated TCI state of a CORESET may be variously provided by considering a part or all of the CORESET index, the type of the RS referenced in the activated TCI state of the CORESET, the QCL type of the RS, or time domain transmission information of the RS.

For example, the priority of an RS may be determined based on the index of a CORESET first (i.e. the lower the index of a CORESET, the higher the priority of an RS), and the priorities of RSs included in CORESETs having the same index may be determined according to the types of the RSs. Alternatively, the priorities of RSs may be determined according to the types of the RSs first, and then if the types of the RSs are the same, the priorities may be determined according to the indices of CORESETs.

As another example, the terminal may identify a priority value of an RS referenced in an activated TCI state of a CORESET, by referring to [Table 8] below. If the priority value is low, the terminal may consider the priority of the RS to be high, and preferentially include the RS with the high priority in a BFD RS set.

TABLE 8

The priority value of an RS referenced
in an activated TCI state of a CORESET $Pri_{RS}(x, y, z) = a \cdot x + b \cdot y + c \cdot z, a, b, c \in \mathbb{N}$
x = 0 The RS supports "QCL-typeD", x = 1 The RS
does not support "QCL-typeD"
y = 0 The RS is a periodic CSI-RS, y = 1 The RS
is an SSB, y = 2 The RS is a semi-persistent
CSI-RS or aperiodic CSI-RS
z: the index of the CORESET In [Table 8], the constants a, b, c included in a priority value formula of an RS referenced in an activated TCI state of a CORESET may be determined by considering the importance degrees of the type of the RS referenced in the activated TO state of the CORESET, the QCL type of the RS, or time domain transmission information of the RS.

In addition, the priority value of an RS referenced in an activated TCI state of a CORE SET, provided in [Table 8], merely corresponds to one of embodiments, and the disclosure is not limited thereto. In other words, the priority of an RS referenced in an activated TCI state of a CORESET may be variously provided by considering a part or all of the CORESET index, the type of the RS referenced in the activated TCI state of the CORESET, the QCL type of the RS, or time domain transmission information of the RS.

Therefore, the terminal may determine a BFD RS set, based on the method described above. Furthermore, the terminal may determine whether there is beam failure, based on the determined BFD RS set, and then determine whether to trigger a BFR procedure. A detailed description is the same as above, and thus will be omitted.

Figure 11:
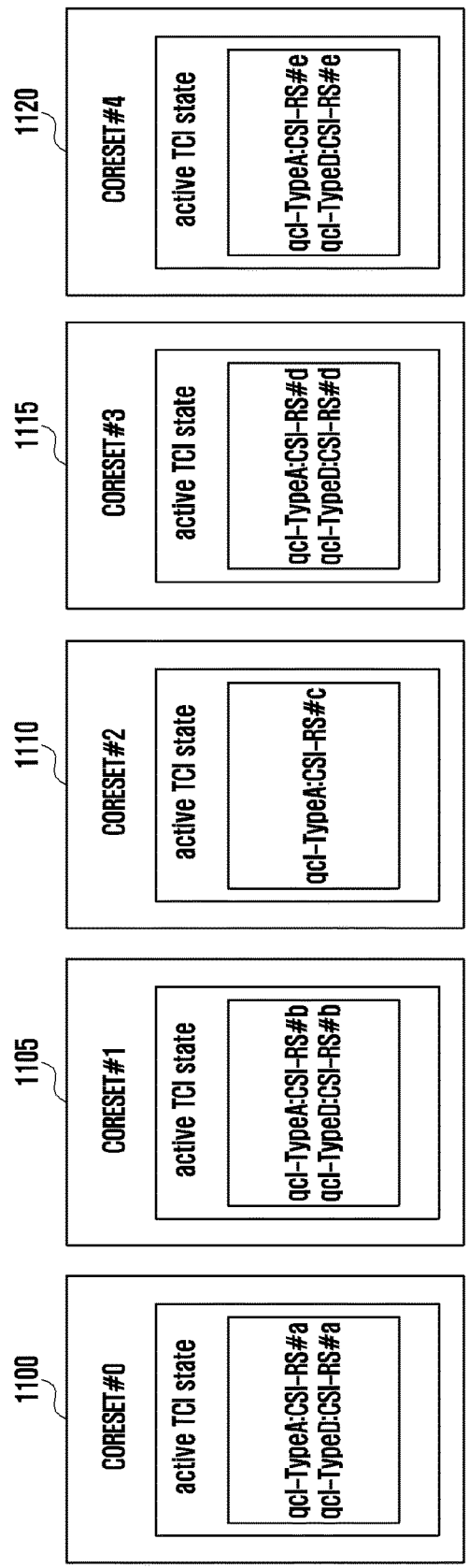
FIG. 11 illustrates a diagram of an example of a CORESET configured for a terminal, and an active TCI state of the CORESET according to embodiments.

FIG. 11 illustrates a diagram of an example of a CORESET configured for a terminal, and an active TCI state of the CORESET according to embodiments.

Referring to FIG. 11, CORESET #0 1100, CORESET #1 1105, CORESET #2 1110, CORESET #3 1115, and CORESET #4 1120 are configured as CORESETS for receiving a PDCCH.

FIG. 11 illustrates a diagram of a case of determining the priorities of RSs, based on [Table 7], and determining a BFD RS set, wherein the size of the BFD RS set is limited to be 3.

A terminal may select three RSs among CSI-RS #a, CSI-RS #b, CSI-RS #c, CSI-RS #d, and CSI-RS #e that are RSs referenced in activated TCI states in CORESET #0 1100, CORESET #1 1105, CORESET #2 1110, CORESET #3 1115, and CORESET #4 1120, and may include the selected three RSs in a BFD RS set.

Referring to [Table 7], the priority of an RS supporting "QCL-typeD" is higher than that of an RS not supporting "QCL-typeD". Therefore, the terminal may determine to preferentially include CSI-RS #a, CSI-RS #b, CSI-RS #d, and CSI-RS #e supporting "QCL-typeD" in a BFD RS set.

If CSI-RS #a, CSI-RS #b, CSI-RS #d, and CSI-RS #e are all periodic CSI-RSs, the priorities of CSI-RS #a, CSI-RS #b, CSI-RS #d, and CSI-RS #e are the same. Therefore, the terminal may determine, to be high, the priority of an RS referenced in an activated TCI state of a CORESET having a low CORESET index, and may include CSI-RS #a, CSI-RS #b, and CSI-RS #d in a BFD RS set. If CSI-RS #a, CSI-RS #b, and CSI-RS #e are periodic CSI-RSs, and CSI-RS #d is a semi-persistent CSI-RS, the priorities of the periodic CSI-RSs are high. Therefore, the terminal may include CSI-RS #a, CSI-RS #b, and CSI-RS #e in a BFD RS set.

Third Embodiment: Method for Determining BFD RS Set by Using Group Information of RS In case that RS group information or an RS group index is configured for an RS referenced in an activated TCI state of a CORESET configured for PDCCH monitoring of a terminal, the terminal may determine a BFD RS set so as to efficiently perform BFD by using grouping information of the RS.

For example, in case that grouping of CORESETs configured for the terminal is supported in order to support the case of NC-JT through multiple TRPs, RSs referenced in the activated TCI state of the CORESET included in one CORESET group may be configured or implicitly indicated as one RS group. In other words, a base station may configure or implicitly instruct the terminal to form one CORESET group by grouping CORESETs configured to receive PDCCHs transmitted from respective TRPs and to form one RS group by grouping RSs referenced in the activated TCI state of the CORESET included in one CORESET group. Here, one RS group may be connected to one CORESET group and one TRP.

As another example, in case that grouping for TCI states is supported in order to efficiently manage multiple TCI states, a base station may configure or implicitly instruct the terminal to configure RSs, referenced in the TCI state included in one TCI state group, as one RS group. For example, with respect to multiple TCI states, one TCI state group may be formed by grouping TCI states having similar beam properties by making reference to "QCL-typeD" including beam information of the corresponding TCI state. In addition, the base station may configure or implicitly instruct the terminal to form one RS group by grouping RSs referenced in the TCI state included in one TCI state group. Here, one RS group may be connected to one TCI state group and beam properties thereof are similar.

In still another example, in case that grouping for PUCCH resources is supported in order to implicitly indicate information on transmission or reception beams of a terminal, the terminal may be configured or implicitly indicated to group RSs, referred to by spatial relation information configured in PUCCH resources included in one PUCCH resource group, into one RS group. For example, with respect to multiple PUCCH resources, one PUCCH resource group may be formed by grouping PUCCH resources having spatial relation information in which the PUCCH resources have the same transmission beam or similar beam properties therebetween by making reference to spatial relation information including transmission beam information of the corresponding PUCCH resource. In addition, the base station may configure or implicitly instruct the terminal to form one RS group by grouping RSs referred to by spatial relation information configured for the PUCCH resource included in one PUCCH resource group. Here, it may be understood that one RS group is connected to one PUCCH group, and the one RS group and the one PUCCH group have a connection relationship with beam information of terminals similar to each other.

(3-1)th Embodiment: BFD RS Set Determination Method Referring to Specific RS Group In an embodiment, in case that RS group information or an RS group index is configured for an RS referenced in an activated TCI state of a CORESET configured for PDCCH monitoring of a terminal, the terminal may determine a BFD RS set including an RS included in a specific RS group by referring only to the specific RS group. The specific RS group included in the BFD RS set may differ according to the meaning of the RS group described above and the selection of an RS group for which the base station is to recognize a beam failure.

For example, in case that grouping of CORESETs configured for the terminal is supported in order to support the case of NC-JT through multiple TRPs, a base station may configure or implicitly instruct the terminal to form one RS group by grouping RSs referenced in the activated TCI state of the CORESET included in one CORESET group. Here, the base station may select an RS group connected to the CORESET group including the CORESET configured to monitor a PDCCH transmitted from a first TRP in order to recognize a beam failure of the PDCCH transmitted from the first TRP (a main TRP or a primary TRP), and thus indicate to the terminal to determine a BFD RS set in the corresponding RS group. Hereinafter, the "CORESET group including the CORESET configured to monitor the PDCCH transmitted from the main TRP" may be referred to as a "main CORESET group", a "first CORESET group", or a "primary CORESET group".

The terminal may include, in the BFD RS set, some or all of the RSs referenced in the activated TCI state of the CORESET included in the first CORESET group. Hereinafter, "a group of RSs referenced in the activated TCI state of the CORESET included in the first CORESET group" may be referred to as a "first RS group", a "main RS group", and a "primary RS group". The terminal may determine the first CORESET group in the plurality of CORESET groups according to an implicit rule, or the base station may indicate the first CORESET group through higher layer signaling. The implicit rule in which the terminal determines a main CORESET group may be possible based on the method as follows, but is not limited thereto.

Method for determining, as a first CORESET group, a CORESET group including CORESET #0 configured during the initial access process Method for determining, as a first CORESET group, a CORESET group having the lowest CORESET group index Method for determining, as a first CORESET group, a CORESET group including CORESET having the lowest CORESET group index The terminal may include, in the BFD RS set, only the RS referenced in the activated TCI state of the CORESET for receiving the PDCCH transmitted from the first TRP, thereby ensuring detection of a beam failure when reception performance of the PDCCH transmitted from the first TRP is deteriorated. Accordingly, it is possible to determine whether the beam failure with the first TRP occurs regardless of whether or not joint transmission through a coordinated TRP (or a second TRP) occurs, and to prevent the criterion for detecting the beam failure from being changed according to whether the joint transmission occurs. Therefore, the reliability of beam failure detection can be increased. In addition, the terminal may detect a beam failure based only on the reception performance of the PDCCH transmitted from the first TRP to thereby guarantee smooth downlink transmission between the first TRP and the terminal regardless of whether joint transmission through the coordinated TRP occurs.

When the base station instructs the terminal to determine the BFD RS set for a specific RS group, the terminal may include, in the BFD RS set, some or all of the RSs included in the specific RS group.

In an embodiment, if the size of the BFD RS set is limited and the number of RSs included in the indicated specific RS group is larger than that of RSs which can be included in the BFD RS set having the limited size, the terminal may select some of the RSs included in the specific RS group according to a predetermined rule or it is possible for the terminal to randomly select some of the RSs to determine the BFD RS set.

The rule for selecting some of the RSs included in the specific RS group may follow the rules for the priority of RSs, provided in the second embodiment, or may be based on a part or all of the index of the CORESET in which the TCI state, to which the RS is referred, is activated, the type of the RS, the QCL type of the RS, or the time domain transmission information of the RS.

For example, it is possible to first include, in the BFD RS set, RSs having a low CORESET index in which the TCI state, to which the RS is referred, is activated, among RSs included in a specific RS group.

As another example, it is possible to include, in the BFD RS set, a periodic CSI-RS prior to other CSI-RSs, among RSs included in a specific RS group.

As another example, it is possible to include, in the BFD RS set, the CST-RS prior to SSB, among RSs referenced in the activated TCI state of the CORESET included in a specific RS group.

As another example, it is possible to first include, in the BFD RS set, an RS supporting "QCL-typeD" including beam information, among RSs referenced in the activated TCI state of the CORESET included in a specific RS group.

In an embodiment, if the size of the BFD RS set is not limited, the terminal may include, in the BFD RS set, all RSs included in the indicated specific RS group. In addition, the terminal may select not to include some of the RSs included in a specific RS group, according to a preconfigured rule, or the terminal may randomly select some of RSs and not include the same in the BFD RS set.

The rule for determining not to include some of the RSs included in a specific RS group may follow the rules for the priority of RSs, provided in the second embodiment, or may be based on a part or all of the type of the RS, the QCL type of the RS, or the time domain transmission information of the RS.

For example, it is possible not to include, in the BFD RS set, a semi-persistent CSI-RS among RSs included in a specific RS group.

As another example, it is possible not to include, in the BFD RS set, an SSB among RSs included in a specific RS group.

As another example, it is possible not to include, in the BFD RS set, an RS that does not support "QCL-typeD" including beam information among the RSs included in a specific RS group.

Figure 12:
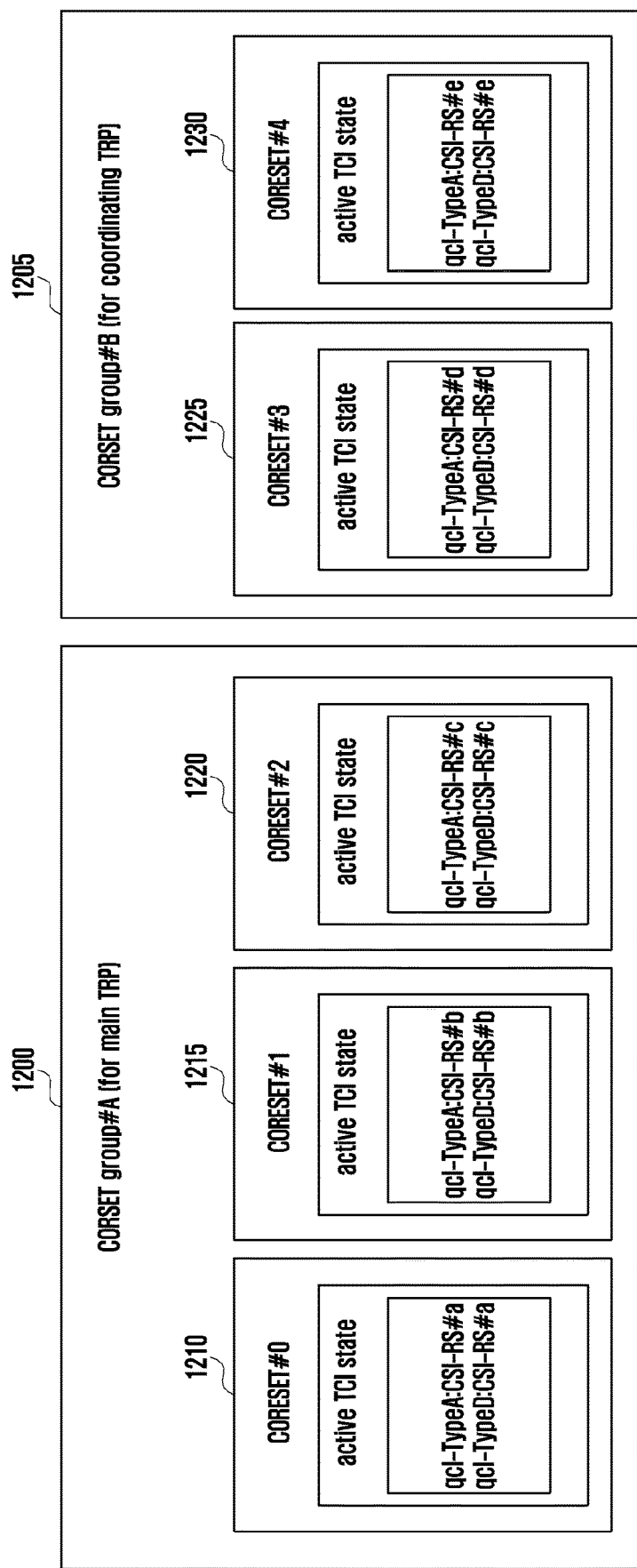
FIG. 12 illustrates a diagram of an example of, when CORESET groups are configured, the CORESET groups, CORESETs included in each group, and an active TCI state of each CORESET.

FIG. 12 illustrates a diagram of an example of, when CORESET groups are configured, the CORESET groups, CORESETs included in each group, and an active TCI state of each CORESET.

Referring to FIG. 12, there is shown a situation in which CORESET group #A 1200 is configured as a group of CORESETs for causing a terminal to receive a PDCCH transmitted from a first TRP, and in which CORESET group #B 1205 is configured as a group of CORESETs for causing the terminal to receive a PDCCH transmitted from a second TRP (coordinated TRP).

CORESET group #A 1200 includes three CORESETs 1210, 1215, and 1220, which are configured to cause the terminal to receive the PDCCH transmitted from the first TRP, and CORESET group #B 1205 includes two CORE-SETs 1225 and 1230, which are configured to cause the terminal to receive the PDCCH transmitted from the second TRP (coordinated TRP).

According to the (3-1)th embodiment, the base station may configure or implicitly instruct the terminal to include, in the BFD RS set, some or all of the RSs included in the RS group connected to the main CORESET group.

Referring to FIG. 12, CSI-RS #a, CSI-RS #b, and CSI-RS #c, which are RSs referenced in the activated TCI state of CORESET #0 1210, CORESET #1 1215, and CORESET #2 1220 included in CORESET group #A 1200, may form an RS group connected to the first CORESET group, and these may be included in the BFD RS set.

If the size of the BFD RS set is not limited, it is possible to include all of CSI-RS #a, CSI-RS #b, and CSI-RS #c in the BFD RS set.

If the size of the BFD RS set is limited to 2, the terminal may select some of CSI-RS #a, CSI-RS #b, and CSI-RS #c according to a preconfigured rule, or it is also possible for the terminal to randomly select some of CSI-RS #a, CSI-RS #b, and CSI-RS #c and include the same in the BFD RS set.

For example, if the RS referenced in the activated TCI state of a CORESET having a low CORESET index is first included in the BFD RS set, CSI-RS #a and CSI-RS #b, which are RSs referenced in the activated TCI state of CORESET #0 1210 and CORESET #1 1215, may be first included in the BFD RS set.

(3-2)th Embodiment: BFD RS Set Determination Method Referring to Multiple RS Groups In an embodiment, in case that RS group information or an RS group index is configured for an RS referenced in an activated TCI state of a CORESET configured for PDCCH monitoring of a terminal, a base station may configure or implicitly instruct a terminal to include, in the BFD RS set, some or all of RSs included in multiple RS groups.

For example, in order to support the case of NC-JT through multiple TRPs, a base station may configure or implicitly indicate the terminal to form one CORESET group by grouping CORESETs configured for PDCCHs transmitted from respective TRPs and to form one RS group by grouping RSs referenced in the activated TCI state of the CORESET included in one CORESET group. Here, the base station may instruct the terminal to include, in the BFD RS set, the RSs included in the multiple RS groups, and when joint transmission of multiple TRPs occurs through the coordinated TRP, the base station performs beam failure detection based on the reception performance of the PDCCH transmitted by the multiple TRPs. Therefore, smooth downlink transmission between the multiple TRPs and the terminal are possible.

Here, the terminal may determine to include, in the BFD RS set, at least one RS for each RS group in multiple configured RS groups. If multiple RSs are included in the RS group, the terminal may select some of the RSs included in the RS group according to the rules for the priority of RSs provided in the second embodiment, or it is also possible for the terminal to randomly select some of the RSs and include the same in the BFD RS set. The rule for selecting some of the RSs included in the specific RS group may be based on a part or all of the CORESET index, the type of the RS, the QCL type of the RS, or the time domain transmission information of the RS.

In an embodiment, if the size of the BFD RS set is limited and the number of RS groups is larger than that of RS groups which can be included in the BFD RS set having the limited size, the terminal may select some RS groups according to a preconfigured rule, select at least one RS included in the selected RS group, and include the selected RS in the BFD RS set, or the terminal may randomly select some RS groups, select at least one RS included in the selected RS group, and include the selected RS in the BFD RS set.

The method of selecting some RS groups among the RS groups may be based on a part or all of whether the RS group is a specific RS group indicated by the base station, the RS group index, the index of the CORESET in which the TCI state, to which the RS included in the RS group is referred, is activated, the type of RS included in the RS group, the QCL type of RS, or the time domain transmission information of the RS. For example, it is possible to prioritize a specific RS group indicated by the base station, and to select at least one RS included in the specific RS group and include the selected RS in the BFD RS set.

As another example, it is possible to prioritize an RS group having a lower RS group index, and to select at least one RS included in the RS group having the lower RS group index and include the selected RS in the BFD RS set.

As another example, it is possible to prioritize an RS group having a lower index of a CORESET in which the TCI state, to which the RS included in the RS group is referred, is activated, and to select at least one RS included therein and include the selected RS in the BFD RS set.

According to an embodiment, if the size of the BFD RS set is not limited, it is possible to select at least one RS included in each RS group from all the configured RS groups and include the selected RS in the BFD RS set. In addition, the terminal may exclude some RS groups according to a preconfigured rule and determine not to include the RS included in the excluded RS group in the BFD RS set, or the terminal may randomly exclude some RS groups and determine not to include the RS included in the excluded RS group in the BFD RS set.

The rule of excluding some RS groups that are not considered to be included in the BFD RS set among all RS groups may be based on a part or all of the type of RS included in the RS group, the QCL type of the RS, or the time domain transmission information of the RS. For example, if the CSI-RS does not exist among RSs included in the RS group, it is possible to exclude the corresponding RS group and not to include the RS group in the BFD RS set.

As another example, if there is no RS supporting "QCL-typeD" including beam information among RSs included in RS groups, it is possible to exclude the corresponding RS group and not to include the same in the BFD RS set. As another example, if there is no periodic CSI-RS among RSs included in the RS group, it is possible to exclude the corresponding RS group and not to include the same in the BFD RS set.

Figure 13:
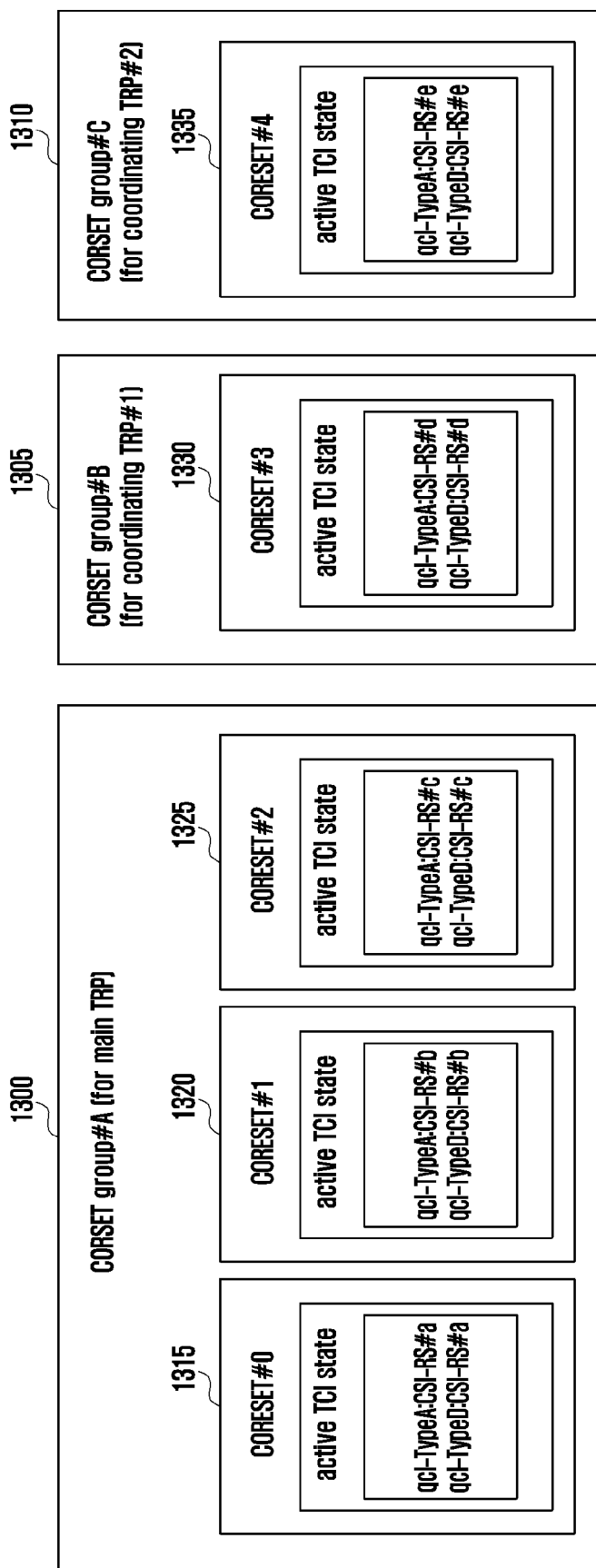
FIG. 13 illustrates a diagram of an example of, when CORESET groups are configured, the CORESET groups, CORESETs included in each group, and an active TCI state of each CORESET.

FIG. 13 illustrates a diagram of an example of, when CORESET groups are configured, the CORESET groups, CORESETs included in each group, and an active TCI state of each CORESET.

Referring to FIG. 13, there is shown a situation in which CORESET group #A 1300 is configured as a group of CORESETs for receiving a PDCCH transmitted from a first TRP, and in which CORESET group #B 1305 and CORESET group #C 1310 are configured as a group of CORESETs for receiving a PDCCH transmitted from a second TRP (coordinated TRP). CORESET group #A 1300 includes three CORESETs 1315, 1320, and 1325, which are configured to cause the terminal to receive the PDCCH transmitted from the first TRP, CORESET group #B 1305 includes one CORESET 1330 configured to cause the terminal to receive the PDCCH transmitted from a coordinated TRP #1, and CORESET group #C 1310 includes one CORESET 1335 configured to cause the terminal to receive the PDCCH transmitted from a coordinated TRP #2. According to the (3-2)th embodiment, the terminal may select at least one RS included in each RS group connected to the individual CORESET group and include the selected RS in the BFD RS set.

Referring to FIG. 13, in the case where the size of the BM RS set is not limited, CSI-RS #a, CSI-RS #b, and CSI-RS #c, which are RSs referenced in the activated TCI state of CORESET #0 1315, CORESET #1 1320, and CORESET #2 1325 included in CORESET group #A 1300, may form an RS group and thus the BFD RS set may include at least one RS. CSI-RS #d, which is an RS referenced in the activated TCI state of CORESET #3 1330 included in the CORESET group #B 1305, may form one RS group and be included in the BFD RS set, and CSI-RS #e, which is an RS referenced in the activated TCI state of CORESET #4 1335 included in the CORESET group #C 1310, may form one RS group and be included in the BFD RS set.

According to the (3-2)th embodiment, the method for determining an RS to be included in the BFD RS set, among CSI-RS #a, CSI-RS #b, and CSI-RS #c, which are RSs referenced in the activated TCI state of CORESET included in CORESET group #A 1300, may follows the rule for the priority of RSs, provided in the second embodiment, or follow a differently determined rule, or the terminal may randomly select some RSs.

For example, if a configuration is made or predetermined such that the BFD RS set includes RSs having a lower CORESET index in which the TCI state, to which an RS is referred, is activated, among RSs included in an RS group, the BFD RS set may include CSI-RS #a, which is an RS referenced in the activated TCI state of CORESET #0 1315 having the lowest CORESET index, among CORESETs included in the CORESET group #A 1300.

Referring to FIG. 13, if the size of the BFD RS set is limited to 2, the terminal may consider selection of some of CORESET group #A 1300, CORESET group #B 1305, and CORESET group #C 1310 according to a preconfigured rule and include the selected group in the BFD RS set, or it is also possible for the terminal to randomly select some of CORESET group #A 1300, CORESET group #B 1305, and CORESET group #C 1310 and include the selected group in the BFD RS set. For example, if a configuration is made or predetermined such that an RS group including RSs having a lower CORESET index in which the TCI state, to which an RS included in an RS group is referred, is activated, is selected, the terminal may include, in the BFD RS set, at least one RS which is referenced in the activated TCI state of the CORESET included in CORESET group #A including CORESET #0 1315, and may include, in the BFD RS set, at least one RS which is referenced in the activated TCI state of the CORESET included in CORESET group #B including CORESET #3 1330.

(3-3)th Embodiment: BFD RS Set Determination Method Considering Priority Between RS Groups In an embodiment, in case that RS group information or an RS group index is configured for an RS referenced in an activated TCI state of a CORESET configured for PDCCH monitoring of a terminal, a base station may configure or implicitly instruct a terminal to include, in a BFD RS set, some or all of RSs included in multiple RS groups.

In an example, the base station may give priority to a specific RS group and configure the terminal to first include, in the BFD RS set, an RS included in a specific RS group. As another example, the base station may first include, in the BFD RS set, at least one RS for each RS group in multiple RS groups configured for the terminal, and additionally include the RS included in a specific RS group in the BFD RS set.

The (3-3)th embodiment may be based on the BFD RS set determination method provided in the (3-1)th embodiment or (3-2)th embodiment. However, it may be understood as providing a method of determining an RS to be additionally included in the BFD RS set when the size of the BFD RS set according to the determination method provided in the (3-1)th embodiment or (3-2)th embodiment is smaller than the size of the predetermined BFD RS set or the size configured by the base station.

For example, in order to support the case of NC-JT through multiple TRPs, a base station may configure or implicitly instruct the terminal to form one CORESET group by grouping CORESETs, configured for causing the terminal to receive PDCCHs transmitted from respective TRPs, and to form one RS group by grouping RSs referenced in the activated TCI state of the CORESET included in one CORESET group. Here, the base station may instruct the terminal to include, in the BFD RS set, some or all of RSs included in the multiple RS groups.

The terminal may first include, in the BFD RS set, RSs included in a main RS group connected to a main CORESET group including the CORESET for receiving the PDCCH transmitted from the first TRP, and thereby ensure detection of a beam failure when reception performance of the PDCCH transmitted from the first TRP is deteriorated. In addition, the terminal may detect a beam failure preferentially based on the reception performance of the PDCCH transmitted from the first TRP to thereby guarantee smooth downlink transmission between the first TRP and the terminal without being affected much by the case of NC-JT through the second TRP (coordinated TRP).

On the one hand, in the case of NC-JT, by performing beam failure detection based on the reception performance of the PDCCH transmitted from multiple TRPs, it is possible to determine whether or not smooth downlink transmission between the multiple TRPs and the terminal is possible.

In an embodiment, the base station may instruct the terminal to first include the RS included in a specific RS group in the BFD RS set by giving priority to the specific RS group. If the size of the BFD RS set is limited and the size of the RS included in the specific RS group is smaller than the size of the BFD RS set, the terminal may first include the RS included in the specific RS group in the BFD RS set, and may additionally include RSs included in the other RS group in the BFD RS set.

A method of additionally determining RSs to be included in the BFD RS set may be based on a predetermined rule or may be randomly selected by the terminal. Here, the method may be determined by considering, as in the (3-1)th embodiment or (3-2)th embodiment, a part or all of the RS group index, the index of the CORESET in which the TCI state, to which the RS included in the RS group is referred, is activated, the type of RS included in the RS group, the QCL type of the RS, or time domain transmission information of the RS. However, the principle is similar to the explanation described in the (3-1)th embodiment or the (3-2)th embodiment, and thus redundant descriptions will be omitted hereinafter.

In an embodiment, the base station may instruct to include, in the BFD RS set, at least one RS for each RS group in multiple RS groups configured in the terminal. If the size of the BFD RS set is limited and the number of configured RS groups is smaller than that of RS groups which can be included in the BFD RS set having the limited size, the terminal may first include at least one RS for each RS group in the BFD RS set, and may additionally include, in the BFD RS set, RSs included in a specific RS group. A method of additionally determining RSs to be included in the BFD RS set may be based on a predetermined rule or may be randomly selected by the terminal. Here, the method may be determined by considering, as in the (3-1)th embodiment, a part or all of the index of the CORESET in which the TCI state, to which the RS is referred, is activated, the type of RS, the QCL type of the RS, or time domain transmission information of the RS. However, the principle is similar to the explanation described in the (3-1)th embodiment, and thus redundant description will be omitted hereinafter.

(3-4)th Embodiment: Method for Individually Configuring BFD RS Set of Each RS Group In an embodiment, in case that RS group information or an RS group index is configured for an RS referenced in the activated TCI state of the CORESET configured for PDCCH monitoring of the terminal, the base station may individually configure a BFD RS set for each RS group.

Alternatively, the terminal may individually configure the BFD RS set for each RS group according to the capabilities of the terminal, and may report to the base station as to whether beam failure indication for each BFD RS set can be reported to a higher layer of the terminal. Accordingly, the base station may be configured to individually configure the BFD RS set only in the case of receiving a report of individual configuration of the BFD RS set for each RS group by the terminal is possible.

The terminal may individually configure a BFD RS set for each RS group, and report a beam failure indication for each BFD RS set to a higher layer of the terminal. Specifically, the terminal may configure BFD RS set corresponding to RS group #0, RS group #1, ..., RS group #N−1, obtained by grouping RSs referenced in the activated TCI state of CORESET configured for PDCCH monitoring, as BFD RS set #0, BFD RS set #1, ..., BFD RS set #N−1. Each BFD RS set may be understood as including some or all of the RSs included in the RS group connected to the BFD RS set.

For each BFD RS set, if a hypothetical PDCCH reception BLER for all of the CORESETs, in which the TCI state referring to the RS included in the BFD RS set is activated, is equal to or greater than a configured threshold, the terminal may report a beam failure indication for the corresponding BFD RS set via higher layer signaling of the terminal.

For example, in order to support the case of NC-JT through multiple TRPs, the terminal may be configured or implicitly indicated to form at least one RS group by grouping the CORESET configured for the PDCCH transmitted from each TRP and grouping RSs referenced in the activated TCI state of the CORESET included in one CORESET group.

Specifically, in the case of NC-JT through multiple TRPs, with respect to TRP #0, TRP #1, ..., TRP #N−1, CORESET group #0, CORESET group #1, ..., CORESET group #N−1 may be configured by grouping the CORESET for causing the terminal to receive the PDCCH. In addition, for each CORESET group, an RS group corresponding to CORESET group #n (n=0, 1, ..., N−1) may be configured as RS group #(n,0), RS group #(n,1), ..., RS group #(n,M) (M>0). In addition, a BFD RS set for an individual RS group may be configured as BFD RS set #(n,0), BFD RS set #(n,1), ..., BFD RS set #(n,M).

Each BFD RS set may be understood as including some or all of the RSs referenced in the activated TCI state of the CORESET included in the CORESET group connected to the RS group in which the BFD RS set is configured.

For each BFD RS set, if a hypothetical PDCCH reception BLER for all of the CORESETs, in which the TCI state referring to the RS included in the BFD RS set is activated, is equal to or greater than a configured threshold, the terminal may report a beam failure indication for the corresponding BFD RS set via higher layer signaling of the terminal.

The higher layer of the terminal may obtain information on whether the beam failure of the individual RS group has occurred by reporting the beam failure indication for the individual BFD RS set. Accordingly, flexible network operation is possible by determining whether to perform the next process of the BFR in a higher layer in consideration of whether a beam failure for some or all of the BFD RS sets occurs.

In an example, the terminal (a higher layer of the terminal) may determine to perform the next process of the BFR only when the terminal receives a report that a beam failure has been detected for the entire BFD RS set. Here, in the case of NC-JT through multiple TRPs, beam failure detection is performed based on the reception performance of the PDCCH transmitted by all TRPs, and the BFR process is performed when smooth downlink transmission between all TRPs and the terminal is impossible, thereby reducing a network burden when the BFR process is unnecessarily performed.

As another example, the terminal (a higher layer of the terminal) may determine to perform the next process of the BFR only when it receives a report that a beam failure has been detected for the BFD RS set(s) of a specific RS group(s). Here, in the case of NC-JT through multiple TRPs, by considering only the beam failure of the BFD RS set(s) for the RS group(s) connected to the first CORESET group, the beam failure can be detected based on the reception performance of the PDCCH transmitted by the first TRP. Accordingly, it is possible to guarantee smooth downlink transmission between the main TRP and the terminal regardless of whether the NC-JT through the second TRP occurs.

For example, the base station may individually configure the BFD RS set for each RS group in the terminal, and may provide, via higher layer signaling, configuration information enabling a lower layer of the terminal to report the beam failure indication for each BFD RS set to a higher layer. The base station may individually indicate to the terminal at least one of the following configuration information for beam failure indication for each BFD RS set.

The size of BFD RS set
    Period of beam failure indication report by a terminal
    The number of times of the beam failure indication report by the terminal, required to perform the next process of BFR
    Timer setting for initializing the number of times of the beam failure indication report by the terminal The terminal may individually determine the beam failure indication reporting information for each BFD RS set by making reference to the configuration information for reporting the beam failure indication for each BFD RS set.

If the base station does not individually indicate some of the configuration information for the beam failure indication reporting for each BFD RS set, the terminal may follow common configuration information for the beam failure indication reporting for all BFD RS sets.

In the present embodiment, a method of determining an RS included in the BFD RS set for each RS group may follow a predetermined rule or may be randomly selected by the terminal. In this case, as in the (3-1)th embodiment, the method may be determined by considering a part or all of the index of the CORESET in which the TCI state, to which the RS is referred, is activated, the type of RS, the QCL type of the RS, or the time domain transmission information of the RS. However, detailed descriptions are similar to those described above in the (3-1)th embodiment, and thus redundant descriptions will be omitted hereinafter.

Figure 14:
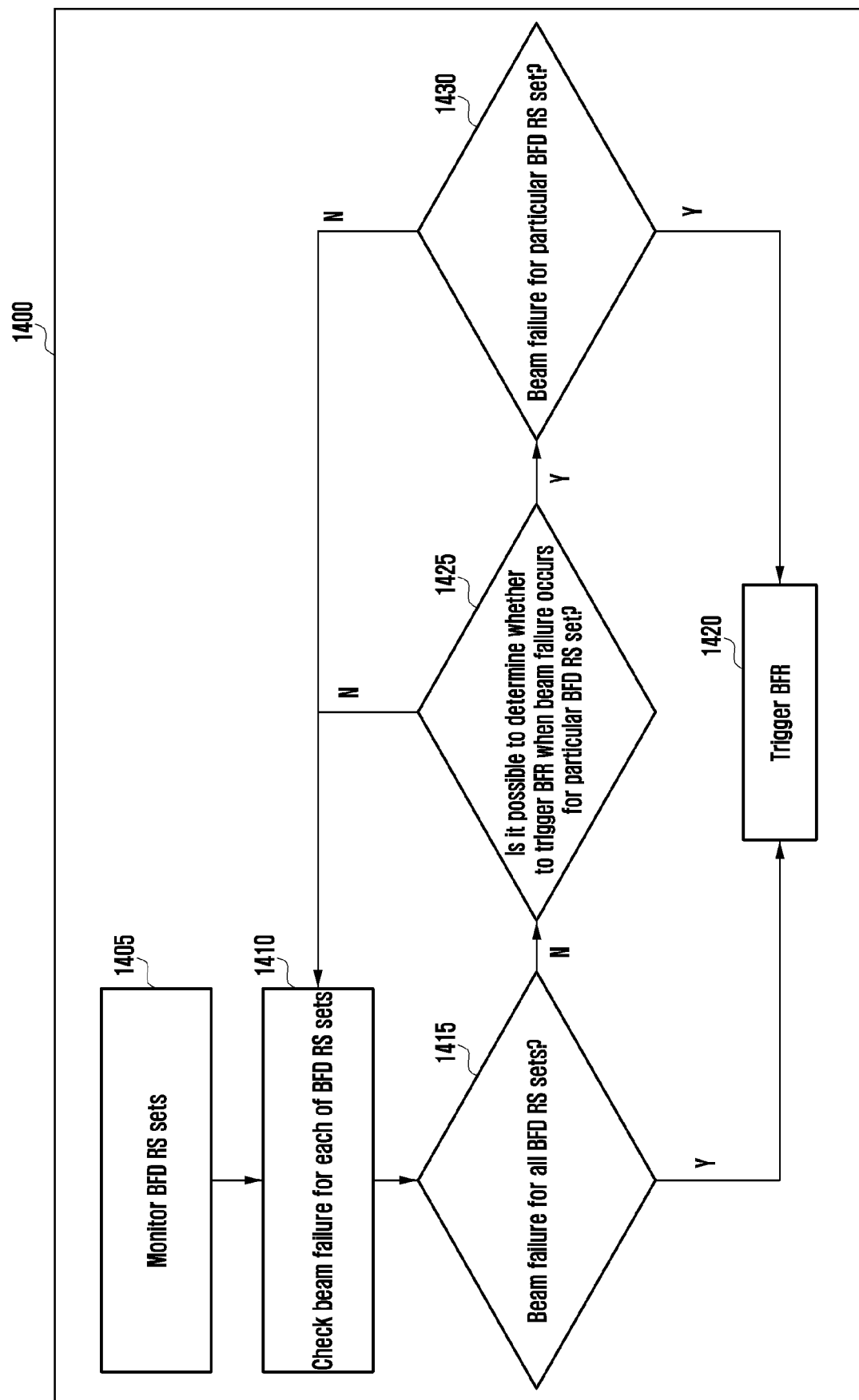
FIG. 14 illustrates a diagram of an example of a flowchart of an operation process of a terminal when a BFD RS set is individually configured for each RS group according to embodiments.

FIG. 14 illustrates a diagram of an example of a flowchart of an operation process of a terminal when a BFD RS set is individually configured for each RS group according to embodiments;

Referring to FIG. 14, when a terminal individually configures a BFD RS set for each RS group, a BFD process may be performed according to a flowchart 1400 illustrating an operation process of the terminal.

The terminal may determine a BFD RS set corresponding to a specific number (M) of RS groups, for example, RS group #0, RS group #1, . . . , RS group #M−1, as BFD RS set #0, BFD RS set #1, . . . , BFD RS set #M−1. In addition, the terminal may monitor whether a beam failure for an individual BFD RS set occurs (indicated by reference numeral 1405). Here, the terminal may receive, from the base station, a configuration of monitoring whether the beam failure for the individual BFD RS set occurs.

The terminal may determine whether a beam failure for an individual BFD RS set occurs according to configuration information relating to the beam failure indication report (indicated by reference numeral 1410).

The terminal may transmit a beam failure indication report for each BM RS set to a higher layer based on a result of the determination made on the beam failure.

Therefore, the terminal (specifically, the higher layer of the terminal) may determine whether to trigger the BFR. Specifically, the terminal may determine whether a beam failure has occurred for all BFD RS sets by considering parameters, such as the number of times of the beam failure indication report by the terminal, required to trigger the BFR, and the timer setting for initializing the number of times of the beam failure indication report by the terminal (indicated by reference numeral 1415).

If it is determined that a beam failure has occurred for all BFD RS sets, the terminal triggers BFR (indicated by reference numeral 1420). Meanwhile, in the disclosure, a case of triggering BFR when it is determined that a beam failure has occurred for all BFD RS sets is described as an example, but the scope of the disclosure is not limited thereto. That is, even in the case where it is determined that a beam failure has occurred for the configuration of the base station or for a predetermined number of BFD RS sets, the BFR may be triggered.

If it is determined that a beam failure has not occurred for one or more BFD RS sets, the terminal may determine, in the case where a beam failure occurs for the BFD RS set(s) related to a specific RS group(s), whether the BFR is triggered for the corresponding BFD RS set (indicated by reference numeral 1425).

In the case where a beam failure occurs for the BFD RS set(s) related to a specific RS group(s), if BFR triggering for the corresponding BFD RS set is not performed (i.e., the case where BFR triggering can be performed only in the case where beam failure occurs for all BFD RS sets), the terminal does not trigger the BFR, and the terminal may continue determination on whether a beam failure for each BFD RS set occurs (indicated by reference numeral 1410).

In the case where a beam failure occurs for a BFD RS set(s) related to a specific RS group(s), if the BFR triggering for the corresponding BFD RS set can be performed, the terminal may determine whether a beam failure has occurred for the RS set(s) connected to the specific RS group(s) (indicated by reference numeral 1430).

Here, when it is determined that a beam failure has occurred for the BFD RS set(s) related to the specific RS group(s), the terminal may trigger the BFR (indicated by reference numeral 1420).

If it is determined that a beam failure has not occurred for the BFD RS set(s) related to a specific RS group(s), the terminal does not trigger the BFR to proceed with the next BFR process, and the terminal continues beam failure indication reporting for each BFD RS set (indicated by reference numeral 1410).

Figure 15:
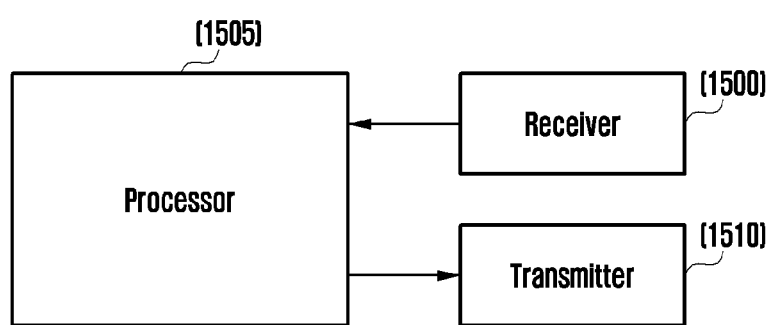
FIG. 15 illustrates a block diagram of a structure of a terminal according to embodiments.

FIG. 15 illustrates a block diagram of a structure of a terminal according to some embodiments.

Referring to FIG. 15, the terminal may include a receiver 1500, a transmitter 1510, and a processor 1505. The processor 1505 may include a memory and a processing unit. According to the communication method of the terminal described above, the receiver 1500 and the transmitter 1510 of the terminal and the processor 1505 may operate. However, the elements of the terminal are not limited to the above-described example. For example, the terminal may include more or fewer elements than the above-described elements. In addition, the receiver 1500, the transmitter 1510, and the processor 1505 may be implemented in the form of a single chip.

The receiver 1500 and the transmitter 1510 may transmit or receive signals to or from a base station. Here, the signals may include control information and data. To this end, the receiver 1500 and the transmitter 1510 may include an RF transmitter for up-converting and amplifying a frequency of a transmitted signal, and an RF receiver for low-noise amplifying a received signal and down-converting a frequency of the received signal. However, this is only an embodiment of the receiver 1500 and the transmitter 1510, and elements of the receiver 1500 and the transmitter 1510 are not limited to the RF transmitter and the RF receiver.

In addition, the receiver 1500 and the transmitter 1510 may receive a signal through a wireless channel, output the signal to the processor 1505, and transmit a signal output from the processor 1505 through the wireless channel.

The processor 1505 may store programs and data necessary for the operation of the terminal. In addition, the processor 1505 may store control information or data included in a signal acquired by the terminal. The processor 1505 may include a storage medium such as a ROM, a RAM, a hard disk, a CD-ROM, and a DVD, or a memory configured by a combination of storage media.

In addition, the processor 1505 may control a series of processes so that the terminal can operate according to the above-described embodiment. According to some embodiments, the processor 1505 may control elements of the terminal so as to receive DCI configured by two layers and simultaneously receive multiple PDSCHs.

Figure 16:
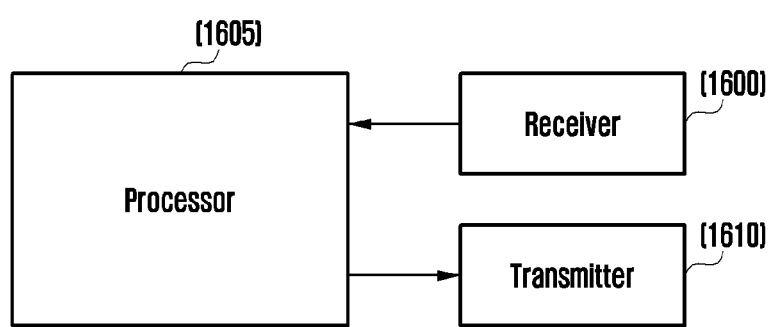
FIG. 16 illustrates a block diagram of a structure of a base station according to embodiments.

FIG. 16 illustrates a block diagram of a structure of a base station according to some embodiments.

Referring to FIG. 16, the base station may include a receiver 1600, a transmitter 1610, and a processor 1605. The processor 1605 may include a memory and a processing unit. According to the communication method of the base station described above, the receiver 1600 and the transmitter 1610 and the processor 1605 of the base station may operate. However, the elements of the base station are not limited to the above-described example. For example, the base station may include more or fewer elements than the above-described elements. In addition, the receiver 1600, the transmitter 1610, and the processor 1605 may be implemented in the form of a single chip.

The receiver 1600 and the transmitter 1610 may transmit or receive signals to or from a base station. Here, the signals may include control information and data. To this end, the receiver 1600 and the transmitter 1610 may include an RF transmitter for up-converting and amplifying a frequency of a transmitted signal, and an RF receiver for low-noise amplifying a received signal and down-converting a frequency of the received signal. However, this is only an embodiment of the receiver 1600 and the transmitter 1610, and elements of the receiver 1600 and the transmitter 1610 are not limited to the RF transmitter and the RF receiver.

In addition, the receiver 1600 and the transmitter 1610 may receive a signal through a wireless channel, output the signal to the processor 1605, and transmit a signal output from the processor 1605 through the wireless channel.

The processor 1605 may store programs and data necessary for the operation of the base station. In addition, the processor 1605 may store control information or data included in a signal acquired by the base station. The processor 1605 may include a storage medium such as a ROM, a RAM, a hard disk, a CD-ROM, and a DVD, or a memory configured by a combination of storage media.

The processor 1605 may control a series of processes so that the base station can operate according to the above-described embodiment. According to some embodiments, the processor 1605 may control each element of the base station in order to configure and transmit DCI including allocation information for the PDSCH.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, embodiments 1 and 2 of the disclosure may be partially combined to operate a base station and a terminal.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    receiving, from a base station, a radio resource control (RRC) message including information on a priority for a plurality of reference signals (RSs);
    identifying activated transmission configuration indicator (TCI) states for control resource sets (CORESETs);
    identifying one or more RSs associated with the activated TCI states;
    determining a beam failure detection (BFD) RS set that includes at least one RS among the one or more RSs, based on the information on the priority for the one or more RSs, wherein a respective priority for each of the one or more RSs is determined based on a respective index of a respective CORESET associated with each of the one or more RSs;
    identifying whether a beam failure is detected based on the at least one RS included in the BFD RS set; and
    in case that the beam failure is detected, transmitting, to the base station, a beam failure recovery (BFR) request message.

2. The method of claim 1,
    wherein the RRC message further includes at least one of size information of the at least one RS or group information of a RS group, and
    wherein the activated TCI states are associated with a physical downlink control channel (PDCCH).

3. The method of claim 2, wherein:
    the group information includes information on a priority of the RS group, and
    the information on the priority of the RS group corresponds to at least one of a group index of the RS group or a CORESET index of the RS group.

4. The method of claim 1, wherein the identifying of whether the beam failure is detected comprises:
    determining whether a radio link quality identified based on the at least one RS is smaller than a threshold;
    in case that the radio link quality is smaller than the threshold, determining whether a beam failure is detected for the at least one RS; and
    in case that the beam failure is detected for the at least one RS, transmitting, to the base station, the BFR request message.

5. The method of claim 4,
    wherein the BFR request message is transmitted in case that a beam failure is detected for all RSs included in the BFD RS set.

6. A method performed by a base station in a wireless communication system, the method comprising:
    transmitting, to a terminal, a radio resource control (RRC) message including information on a priority for a plurality of reference signals (RSs); and
    receiving, from the terminal, a beam failure recovery (BFR) request message,
    wherein a beam failure detection (BFD) RS set that includes at least one RS among one or more RSs is determined by the terminal based on the information on the priority for the one or more RSs, wherein the one or more RSs are associated with activated TCI states for control resource sets (CORESETs), wherein a respective priority for each of the one or more RSs is determined based on a respective index of a respective CORESET associated with each of the one or more RSs, wherein a beam failure is detected based on the at least one RS included in the BFD RS set, and wherein the BFR request message is received in case that the beam failure is detected for the at least one RS included in the BFD RS set.

7. The method of claim 6, wherein the RRC message further includes at least one of size information of the at least one RS or group information of a RS group, and wherein the activated TCI states are associated with a physical downlink control channel (PDCCH).

8. The method of claim 7, wherein the group information includes information on a priority of the RS group, and wherein the information on the priority of the RS group corresponds to at least one of a group index of the RS group or a CORESET index of the RS group.

9. A terminal in a wireless communication system, the terminal comprising:

a transceiver; and a processor configured to:

receive, from a base station, a radio resource control (RRC) message including information on a priority for a plurality of reference signals (RSs);

identify activated transmission configuration indicator (TCI) states for control resource sets (CORESETs);

identify one or more RSs associated with the activated TCI states;

determine a beam failure detection (BFD) RS set that includes at least one RS among the one or more RSs based on the information on the priority for the one or more RSs, wherein a respective priority for each of the one or more RSs is determined based on a respective index of a respective CORESET associated with each of the one or more RSs;

identify whether a beam failure is detected based on the at least one RS included in the BFD RS set; and in case that the beam failure is detected, transmit, to the base station, a beam failure recovery (BFR) request message.

10. The terminal of claim 9, wherein the RRC message further includes at least one of size information of the at least one RS or group information of a RS group, and wherein the activated TCI states are associated with a physical downlink control channel (PDCCH).

11. The terminal of claim 10, wherein:

the group information includes information on a priority of the RS group, and the information on the priority of the RS group corresponds to at least one of a group index of the RS group or a CORESET index of the RS group.

12. The terminal of claim 9, wherein the processor is further configured to:

determine whether a radio link quality identified based on the at least one RS is smaller than a threshold;

in case that the radio link quality is smaller than the threshold, determine whether a beam failure is detected for the at least one RS; and in case that the beam failure is detected for the at least one RS, transmit, to the base station, the BFR request message.

13. The terminal of claim 12, wherein the BFR request message is transmitted in case that a beam failure is detected for all RSs included in the BFD RS set.

14. A base station in a wireless communication system, the base station comprising:

a transceiver; and a processor configured to:

transmit, to a terminal, a radio resource control (RRC) message including information on a priority for a plurality of reference signals (RSs); and receive, from the terminal, a beam failure recovery (BFR) request message, wherein a beam failure detection (BFD) RS set that includes at least one RS among one or more RSs is determined by the terminal based on the information on the priority for the one or more RSs, wherein the one or more RSs are associated with activated TCI states for control resource sets (CORESETs), wherein a respective priority for each of the one or more RSs is determined based on a respective index of a respective CORESET associated with each of the one or more RSs, wherein a beam failure is detected based on the at least one RS included in the BFD RS set, and wherein the BFR request message is received in case that the beam failure is detected for the at least one RS included in the BFD RS set.

15. The base station of claim 14, wherein the RRC message further includes at least one of size information of the at least one RS or group information of a RS group, and wherein the activated TCI states are associated with a physical downlink control channel (PDCCH).

16. The base station of claim 15, wherein the group information includes information on a priority of the RS group, and wherein the information on the priority of the RS group corresponds to at least one of a group index of the RS group or a CORESET index of the RS group.

* * * * *